US010787943B2

(12) United States Patent
Kishikawa et al.

(10) Patent No.: US 10,787,943 B2
(45) Date of Patent: Sep. 29, 2020

(54) EXHAUST DEVICE FOR INTERNAL COMBUSTION ENGINE

(71) Applicant: HONDA MOTOR CO., LTD., Tokyo (JP)

(72) Inventors: Keisuke Kishikawa, Wako (JP); Yoji Fukui, Wako (JP); Kazuya Yoshio, Wako (JP); Takuya Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 16/085,310

(22) PCT Filed: Jan. 13, 2017

(86) PCT No.: PCT/JP2017/001129
§ 371 (c)(1),
(2) Date: Sep. 14, 2018

(87) PCT Pub. No.: WO2017/159020
PCT Pub. Date: Sep. 21, 2017

(65) Prior Publication Data
US 2019/0055866 A1    Feb. 21, 2019

(30) Foreign Application Priority Data
Mar. 17, 2016    (JP) .................................. 2016-054542

(51) Int. Cl.
*F01N 13/02*    (2010.01)
*F01N 1/00*    (2006.01)
(Continued)

(52) U.S. Cl.
CPC ............. *F01N 1/006* (2013.01); *F01N 1/026* (2013.01); *F01N 1/06* (2013.01); *F01N 1/08* (2013.01);
(Continued)

(58) Field of Classification Search
CPC . F01N 1/006; F01N 1/08; F01N 1/089; F01N 1/163; F01N 1/165; F01N 1/166;
(Continued)

(56) References Cited

U.S. PATENT DOCUMENTS 8,851,230 B2    10/2014   Ono et al.
2006/0000205 A1    1/2006   Bozmoski et al.

FOREIGN PATENT DOCUMENTS

EP    1 900 624 A1    3/2008
JP    56-139811    10/1981
(Continued)

OTHER PUBLICATIONS

Machine translation of JP S56-139811U, accessed on Jan. 28, 2020. (Year: 2020).*
(Continued)

*Primary Examiner* — Jonathan R Matthias
(74) *Attorney, Agent, or Firm* — Birch, Stewart, Kolasch & Birch, LLP

(57) ABSTRACT

An exhaust muffler includes a first muffler section connected to an exhaust pipe and a second muffler section connected to the first muffler section. Exhaust gases delivered from the exhaust pipe are discharged from the first muffler section and the second muffler section out of the exhaust muffler. The first muffler section includes a tubular member made up of an inner pipe to which the exhaust pipe is connected and an outer pipe covering the inner pipe, and a connector connecting the tubular member and the second muffler section to each other. The first muffler section has a first expansion chamber defined therein between the inner pipe and the outer pipe. The inner pipe houses therein a valve for changing an amount of exhaust gases passing through the inner pipe. The first muffler section includes a curved portion that is curved vertically as viewed in side elevation of the
(Continued)

vehicle. The exhaust muffler has a second expansion chamber defined in the second muffler section rearward and upward of the first muffler section, the second expansion chamber having a cross-sectional area larger than a cross-sectional area of the first expansion chamber. There is thus provided an exhaust device for an internal combustion engine, which includes a muffler compact in a longitudinal direction thereof.

13 Claims, 19 Drawing Sheets

(51) Int. Cl.
| | | |
|---|---|---|
| *F01N 1/08* | (2006.01) | |
| *F01N 1/16* | (2006.01) | |
| *F01N 1/18* | (2006.01) | |
| *F01N 13/00* | (2010.01) | |
| *F01N 13/14* | (2010.01) | |
| *F01N 1/02* | (2006.01) | |
| *F01N 1/06* | (2006.01) | |
| *F01N 3/28* | (2006.01) | |
| *F01N 13/08* | (2010.01) | |
| *B62K 11/04* | (2006.01) | |

(52) U.S. Cl.
CPC ............. *F01N 1/089* (2013.01); *F01N 1/163* (2013.01); *F01N 1/165* (2013.01); *F01N 1/166* (2013.01); *F01N 1/18* (2013.01); *F01N 3/2882* (2013.01); *F01N 13/007* (2013.01); *F01N 13/02* (2013.01); *F01N 13/082* (2013.01); *F01N 13/141* (2013.01); *B62K 11/04* (2013.01); *F01N 2230/04* (2013.01); *F01N 2240/20* (2013.01); *F01N 2240/36* (2013.01); *F01N 2340/02* (2013.01); *F01N 2340/04* (2013.01); *F01N 2470/02* (2013.01); *F01N 2470/08* (2013.01); *F01N 2470/10* (2013.01); *F01N 2470/20* (2013.01); *F01N 2470/24* (2013.01); *F01N 2490/04* (2013.01); *F01N 2490/08* (2013.01); *F01N 2490/155* (2013.01); *F01N 2490/18* (2013.01); *F01N 2590/04* (2013.01)

(58) Field of Classification Search
CPC ... F01N 13/02; F01N 2240/36; F01N 2490/08
See application file for complete search history.

(56) References Cited

FOREIGN PATENT DOCUMENTS

| JP | 1-155013 A | 6/1989 |
|---|---|---|
| JP | 2-81911 A | 3/1990 |
| JP | 2006-17124 A | 1/2006 |
| JP | 2008-69705 A | 3/2008 |
| JP | 2014-47762 A | 3/2014 |
| JP | 2014-69597 A | 4/2014 |

OTHER PUBLICATIONS

International Search Report issued in PCT/JP2017/001129 (PCT/ISA/210), dated Feb. 28, 2017.

* cited by examiner

EXHAUST DEVICE FOR INTERNAL COMBUSTION ENGINE

TECHNICAL FIELD

The present invention relates to an exhaust device for an internal combustion engine, in which an exhaust valve is provided in an inner pipe of double-walled pipes of an exhaust muffler, which inner pipe is connected to an exhaust pipe, and in which the exhaust valve operates to open and close the inner pipe to switch between flow passageways for exhaust gases such that when the exhaust valve closes the inner pipe, one of the flow passageways positioned upstream of the exhaust valve is selected for the exhaust gases to flow therethrough.

BACKGROUND ART

Heretofore, there has been an exhaust device in which a catalyst is disposed in an exhaust muffler, an inlet pipe is held in fluid communication with the catalyst downstream thereof for receiving exhaust gases that have passed through the catalyst, an outer pipe covers the outer circumferential surface of the inlet pipe, the inlet pipe and the outer pipe serving as double-walled pipes, and an exhaust valve is provided in the inlet pipe for opening and closing an exhaust passage pipe thereby to switch between the inlet pipe and a flow passageway for exhaust gases defined between the inlet pipe and the outer pipe. In the exhaust device of the above structure, the double-walled pipes extend straight, so that the muffler is required to be large in size in its longitudinal directions in order to keep the length of the exhaust passageway.

PRIOR ART DOCUMENT

Patent Document

[Patent Document 1]
  JP 2006-017124 A

SUMMARY OF THE INVENTION

Underlying Problem to be Solved by the Invention

An exhaust device for an internal combustion engine according to the present invention has been devised in order to overcome the above difficulties. It is an object of the present invention to provide an exhaust device for an internal combustion engine, which includes a muffler that is compact in a longitudinal direction thereof.

Means to Solve the Underlying Problem

The present invention provides an exhaust device for an internal combustion engine, for discharging exhaust gases from an internal combustion engine supported on a vehicle body frame of a saddle-type vehicle. The exhaust device includes an exhaust pipe connected to the internal combustion engine, and an exhaust muffler connected to a downstream side of the exhaust pipe, in which the exhaust muffler includes a first muffler section connected to a downstream end of the exhaust pipe and a second muffler section connected to a downstream side of the first muffler section, to cause exhaust gases delivered from the exhaust pipe to pass through the first muffler section and be discharged from the second muffler section out of the exhaust muffler; the first muffler section includes a tubular member made up of an inner pipe to which the exhaust pipe is connected and an outer pipe covering the inner pipe, and a connector connecting the tubular member and the second muffler section to each other; the first muffler section has a first expansion chamber defined therein between the inner pipe and the outer pipe; the inner pipe houses therein a valve for changing an amount of exhaust gases passing through the inner pipe; the first muffler section includes a curved portion curved vertically as viewed in side elevation of the vehicle; and the exhaust muffler has a second expansion chamber defined in the second muffler section rearward and upward of the first muffler section, the second expansion chamber having a cross-sectional area larger than a cross-sectional area of the first expansion chamber.

With the above arrangement, there is provided the curved portion where the tubular member which is of a multi-walled pipe configuration made up of the inner pipe and the outer pipe is vertically curved, thereby allowing the first muffler section to be inclined vertically, so that the length of the first muffler section in the longitudinal directions is reduced while making it easy to increase the volume of the first muffler section. There is thus provided an exhaust device for an internal combustion engine including a muffler that is compact in a longitudinal direction thereof. As the first muffler section positioned forwardly is smaller in diameter and the second muffler section, in which the second expansion chamber larger in cross-sectional area than the first expansion chamber is disposed, is disposed at a higher position on the vehicle, the saddle-type vehicle can have a larger banking angle.

The present invention also provides an exhaust device for an internal combustion engine, for discharging exhaust gases from an internal combustion engine supported on a vehicle body frame of a saddle-type vehicle. The exhaust device includes an exhaust pipe connected to the internal combustion engine, and an exhaust muffler connected to a downstream side of the exhaust pipe, in which the saddle-type vehicle includes a swing arm on which a rear wheel is supported by a rear wheel drive axle and which is swingably supported on the vehicle body frame by a pivot shaft; the exhaust muffler includes a first muffler section connected to a downstream side of the exhaust pipe and a second muffler section connected to a downstream side of the first muffler section, in a manner to cause exhaust gases delivered from the exhaust pipe to pass through the first muffler section and to be discharged from the second muffler section out of the exhaust muffler; the first muffler section includes a tubular member made up of an inner pipe to which the exhaust pipe is connected and an outer pipe covering the inner pipe, and a connector connecting the tubular member and the second muffler section to each other; the first muffler section has a first expansion chamber defined therein between the inner pipe and the outer pipe; the inner pipe houses therein a valve for changing an amount of exhaust gases passing through the inner pipe; the first muffler section has at least a portion disposed below the swing arm in a widthwise direction of the vehicle, extends outwardly from a position below the swing arm, and has a curved portion curved in a transverse direction of the vehicle outwardly of the swing arm such that the second muffler section lies along a longitudinal direction of the vehicle; and the exhaust muffler has a second expansion chamber defined in the second muffler section rearwardly of the first muffler section, the second expansion chamber having a cross-sectional area larger than a cross-sectional area of the first expansion chamber.

With the above arrangement, the tubular member, which is of a multi-walled pipe configuration made up of the inner pipe and the outer pipe, extends from a position in front of the rear wheel to a position on a side thereof, and there is provided the curved portion curved in the transverse directions of the vehicle such that the second muffler section lies along the longitudinal directions of the vehicle outwardly of the swing arm. Therefore, the muffler section is compact in a longitudinal direction thereof, and the expansion chambers, which are large in size, in the rear section of the muffler section are prevented from protruding in the widthwise directions of the vehicle, keeping a banking angle for the saddle-type vehicle. As the distance that the first muffler section lies in the widthwise directions of the vehicle is gained, the volume of the first expansion chamber is increased.

In the above arrangement, the tubular member of the first muffler section may be disposed on a line segment interconnecting the pivot shaft and the rear wheel drive axle at a point closer to the pivot shaft than a point which is spaced from the pivot shaft by a distance that is two thirds of the length of the line segment.

With the above arrangement, since the tubular member is disposed closer to the pivot shaft, the tubular member and the swing arm can be placed in a vertical array at a position where the range of angular movement of the swing arm is relatively small. Therefore, limitations on the height of the tubular member are reduced, and the volume of the first expansion chamber is increased.

In the above arrangement, the pivot shaft may be disposed at a higher position than the rear wheel drive axle as viewed in side elevation.

With the above arrangement, because the pivot shaft is disposed at a higher position than the rear wheel drive axle, a large space is available below the swing arm near the pivot shaft as a space where the tubular member of a multi-walled pipe configuration larger in diameter than a single-walled pipe configuration is disposed.

In the above arrangement, the exhaust device may include a valve actuator for actuating the valve, in which the valve actuator is disposed above the first muffler section rearward of the vehicle body frame and below the swing arm in a widthwise direction of the vehicle.

With the above arrangement, as the valve actuator is surrounded by the vehicle body frame, the swing arm, and the first muffler section, it is protected without a dedicated cover provided therefor.

In the above arrangement, the exhaust pipe may be inclined from one side in a widthwise direction of the vehicle across the center of the vehicle toward the other side of the vehicle where the first muffler section is disposed, below the internal combustion engine.

With the above arrangement, inasmuch as the exhaust pipe and the first muffler section are inclined in the widthwise direction of the vehicle, the exhaust pipe and the first muffler section can have increased lengths.

In the above arrangement, the exhaust pipe may house a catalytic device therein, and the catalytic device may be offset to one side in a widthwise direction of the vehicle, and have its upper and other sides surrounded by the internal combustion engine.

With the above arrangement, as the catalytic device is disposed at a position surrounded by the internal combustion engine, the temperature of the catalyst is increased by the heat of the internal combustion engine. The exhaust pipe, which includes a short pipe, provides a passage between the catalyst and the first muffler section, resulting in a reduction in the cost of the exhaust device. As the catalyst is not disposed in the first muffler section which is of a multi-walled pipe configuration, the volume of the first expansion chamber can be increased.

In the above arrangement, the second muffler section may house therein an exhaust passage pipe connected to a downstream end of the inner pipe, the exhaust passage pipe may have a first opening that is open at an upstream end thereof which is connected to the inner pipe and a second opening into which exhaust gases that have passed through the second expansion chamber flow, and the upstream end of the exhaust passage pipe and the downstream end of the inner pipe may be telescopically connected to each other.

With the above arrangement, the inner pipe and the exhaust passage pipe are axially interfitted, so that the inner pipe and the exhaust passage pipe can easily be assembled together and the exhaust device can be reduced in weight and cost as the number of welded spots thereon reduced. Since the pipes are expandable and contractible by heat in their longitudinal directions, the telescopically interfitted structure is able to absorb their thermally induced expansions and contractions.

In the above arrangement, the inner pipe may be made up of a plurality of divided inner pipes that are telescopically connected to each other by being interfitted.

With the above arrangement, since the divided inner pipes are axially interfitted, the divided pipes and the second expansion chamber can easily be assembled together and the exhaust device can be reduced in weight and cost as the number of welded spots thereon is reduced. Since the pipes are expandable and contractible by heat in their longitudinal directions, the telescopically interfitted structure is able to absorb their thermally induced expansions and contractions.

In the above arrangement, the curved portion may be disposed between an area where the valve is disposed and an area where the exhaust passage pipe 31 is connected.

With the above arrangement, the curved portion is disposed between the area where the valve is disposed and the area where the connector is connected. Therefore, the valve is disposed in an area shaped as a straight pipe other than the curved portion, and hence may have its valve configuration and valve actuating mechanism simplified. The exhaust passage pipe is provided as a straight pipe, simplifying the second expansion chamber that houses the exhaust passage pipe therein.

Advantageous Effect of Invention

According to the present invention, there is provided an exhaust device for an internal combustion engine, which includes a muffler that is compact in a longitudinal direction thereof.

DESCRIPTION OF EMBODIMENTS OF THE INVENTION

An exhaust device 20 for an internal combustion engine according to a first embodiment of the present invention for use on a saddle-type vehicle will be described below with reference to FIGS. 1 through 18.

Figure 1:
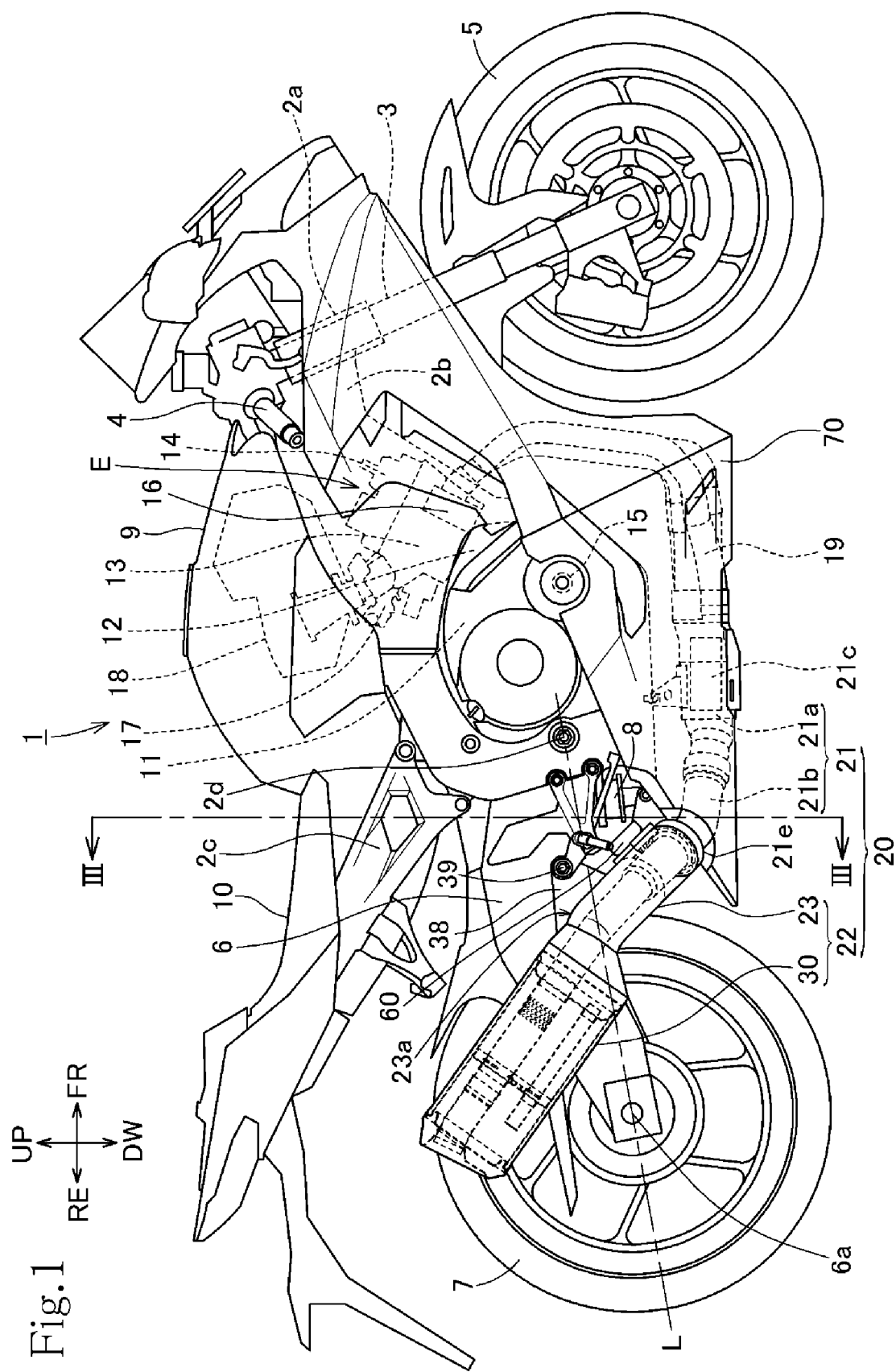
FIG. 1 is a left-hand side elevational view of a two-wheel motorcycle incorporating an exhaust device for an internal combustion engine according to a first embodiment of the present invention.

FIG. 1 is a right-hand side elevational view of a two-wheel motorcycle 1 as an example of a saddle-type vehicle incorporating the exhaust device 20 according to the present embodiment. In the present description, forward, rearward, leftward, and rightward directions are defined with respect to the posture of the motorcycle 1 that is oriented in a forward direction along which the motorcycle 1 moves ahead.

The motorcycle 1 includes a vehicle body frame 2 constructed as follows. A pair of left and right main frames 2b and 2b is fixed to a head pipe 2a and extends rearward and substantially horizontally and is bent downward in surrounding relation to an internal combustion engine E of the motorcycle 1. Seat rails 2c are mounted on upper rear portions of the main frames 2b and extend rearward while spreading to the left and right.

In the vehicle body frame 2, a front fork 3 is pivotally supported on the head pipe 2a, and a handle 4 extending to the left and right is mounted on an upper end of the front fork 3. A front wheel 5 is rotatably supported on a lower end of the front fork 3. A swing arm 6 has a front end pivotally supported by a pivot shaft 2d mounted on lower portions of the main frames 2b and extends rearward, and a rear wheel 7 is rotatably supported on a rear end of the swing arm 6 by a rear wheel drive axle 6a. A rear cushion 8 is interposed between the swing arm 6 and a lower portion of the vehicle body frame 2. A fuel tank 9 is mounted on the main frames 2b and the seat rails 2c, and a rider's seat 10 is supported on the seat rails 2c behind the fuel tank 9. A cowl 70 extending from a front upper portion of the motorcycle 1 to side lower portions thereof is attached to the vehicle body of the motorcycle 1.

The internal combustion engine E supported on the vehicle body frame 2 includes an in-line four-cylinder, four-stroke internal combustion engine, for example, and includes a cylinder block 12 and a cylinder head 13 that are stacked successively on a crankcase 11 and fastened integrally together by bolts (not depicted), with the cylinder head 13 being covered with a cylinder head cover 14 disposed on its upper portion. The internal combustion engine E has a crankshaft 15 oriented in the widthwise directions of the vehicle body, is surrounded by the vehicle body frame 2, and has cylinders 16 of the internal combustion engine E slightly inclined forward. Rotary driver power of the crankshaft 15 is transmitted through the rear wheel drive axle 6a to the rear wheel 7 by a drive belt, not shown. The pivot shaft 2d by which the swing arm 6 is pivotally supported is disposed at a higher position than the rear wheel drive axle 6a as the vehicle is viewed in side elevation of FIG. 1.

To the cylinders 16 of the internal combustion engine E, there are connected an intake manifold (not depicted) having a fuel injection valve (not depicted), a throttle body 17, a connecting tube (not depicted), and an air cleaner 18 arranged in succession. Ambient air that is drawn in from the air cleaner 18 is mixed with a fuel injected from the fuel injection valve, producing an air-fuel mixture that is delivered to the cylinders 16 of the internal combustion engine E in which the air-fuel mixture is burned.

An exhaust manifold 19 is connected to the cylinders 16 of the internal combustion engine E. The exhaust manifold 19 includes pipes connected to the respective cylinders 16, extends downward, is bent and extends rearward, and has a downstream end connected to an exhaust pipe 21. The exhaust pipe 21 has a downstream end 21e connected to an exhaust muffler 22. The exhaust pipe 21 and the exhaust muffler 22 jointly make up the exhaust device 20. The exhaust muffler 22 includes a first muffler section 23 connected to the exhaust pipe 21 and a second muffler section 30 connected to a rear portion of the first muffler section 23. Exhaust gases discharged from the cylinders 16 of the internal combustion engine E are delivered from the exhaust manifold 19 to the exhaust device 20, from which the exhaust gases are discharged into the ambient air. The exhaust device 20 includes an exhaust device mount member 38 by which the exhaust device 20 is mounted on the vehicle body frame 2 in a manner to extend obliquely rearward and upward at a position on the right-hand side of the motorcycle 1.

Figure 4:
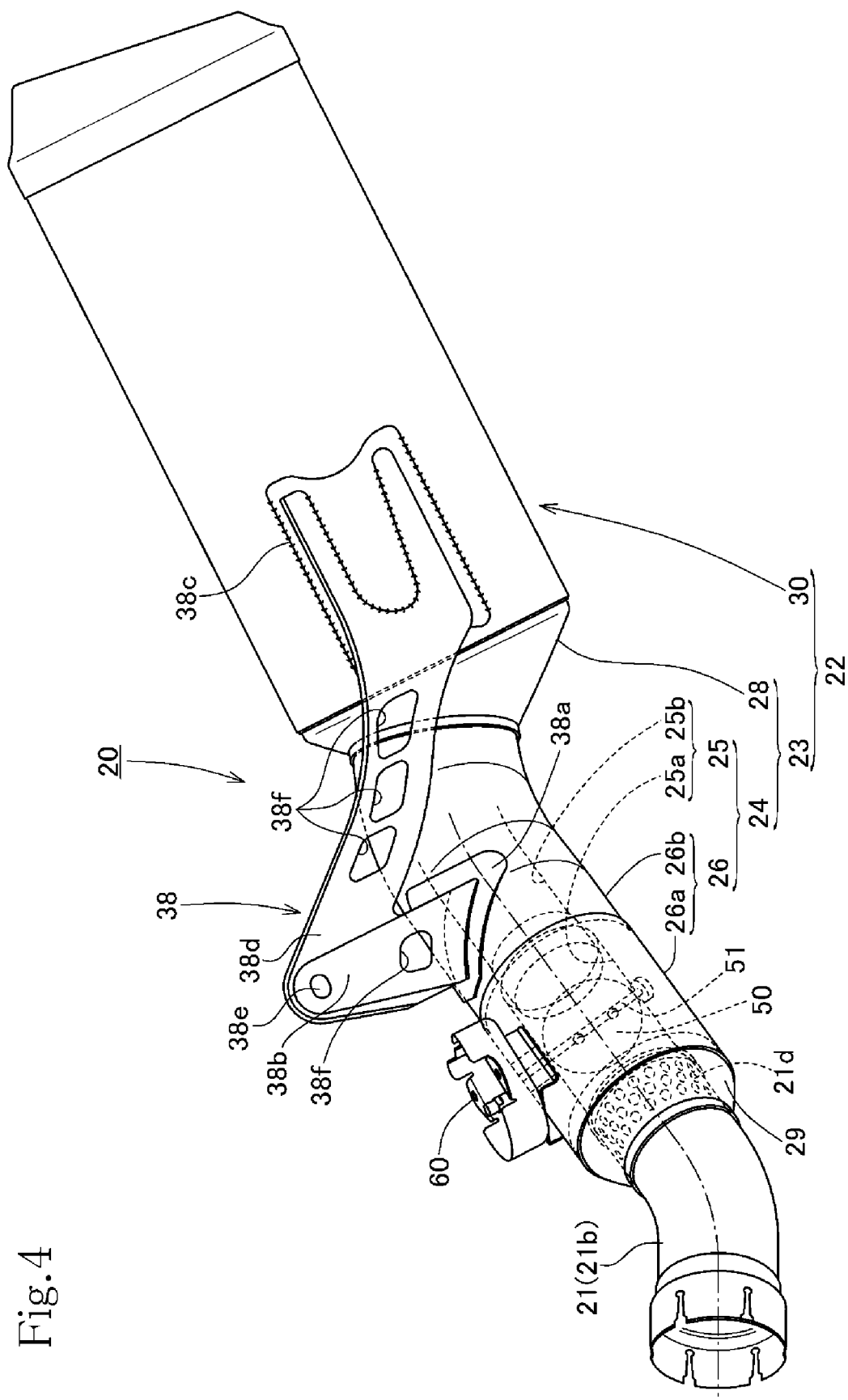
FIG. 4 is a perspective view of the exhaust device.

As shown in FIG. 4, the exhaust device mount member 38 includes a front mount 38a and a rear mount 38c that are fixed respectively to the first muffler section 23 and the second muffler section 30, a front mount piece 38b extending from the front mount 38a upward of the first muffler section 23, and a rear mount piece 38d extending from the rear mount 38c and joining the rear mount 38c to an upper end of the front mount piece 38b. A mount boss 38e as a vehicle mount to be mounted on the motorcycle 1 is provided on the junction between the front mount piece 38b and the rear mount piece 38d. The exhaust device mount member 38 also has through holes 38f, one in the front mount piece 38b and three in the rear mount piece 38d, for making itself lightweight. As depicted in FIG. 1, a mounting bolt 39 is inserted through the mount boss 38e of the exhaust device mount member 38 and fastened to the motorcycle 1, thereby mounting the exhaust device 20 to the motorcycle 1.

Figure 5:
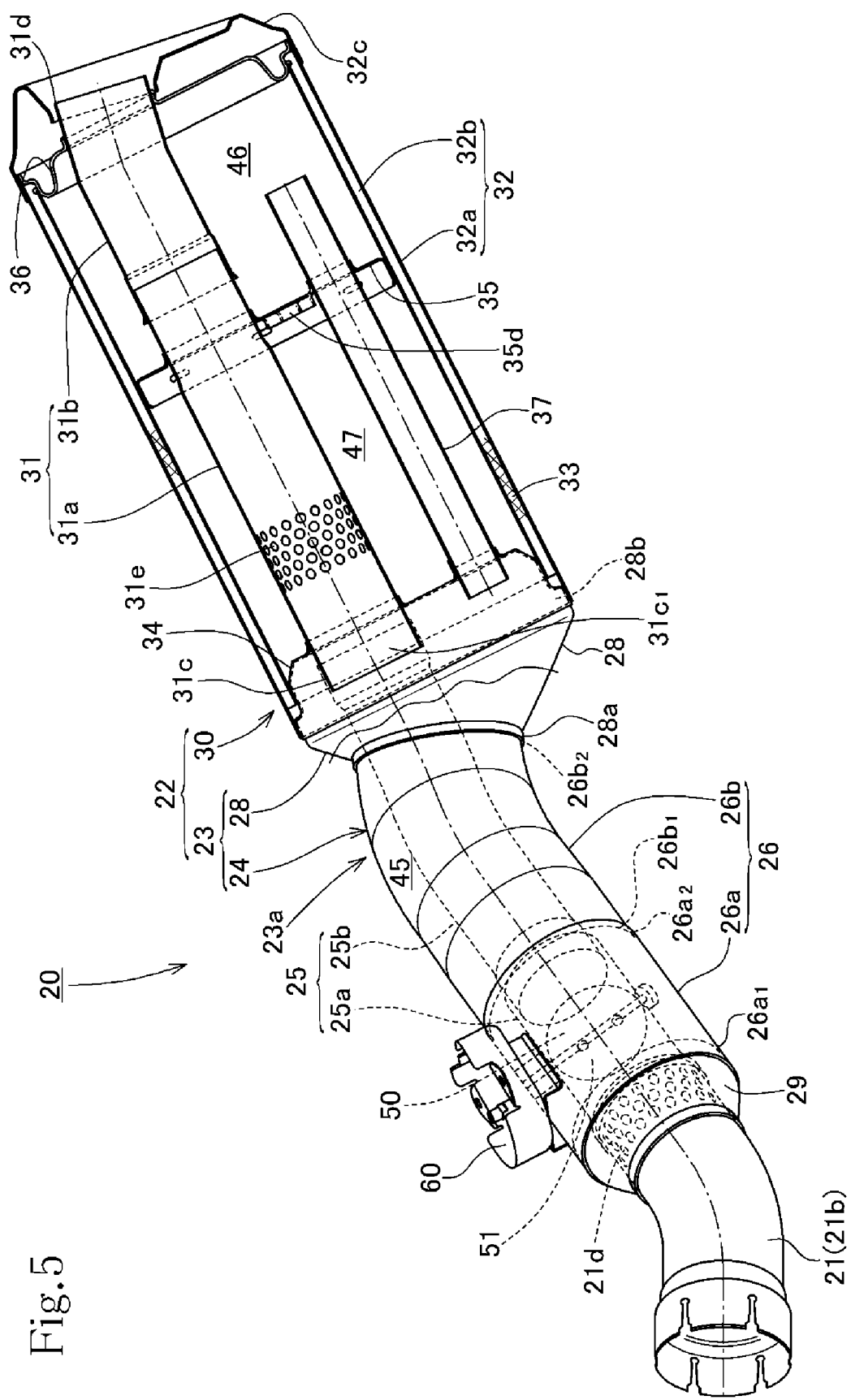
FIG. 5 is a perspective view, partly cut away, of the exhaust device with an exhaust device mount member detached.
Figure 6:
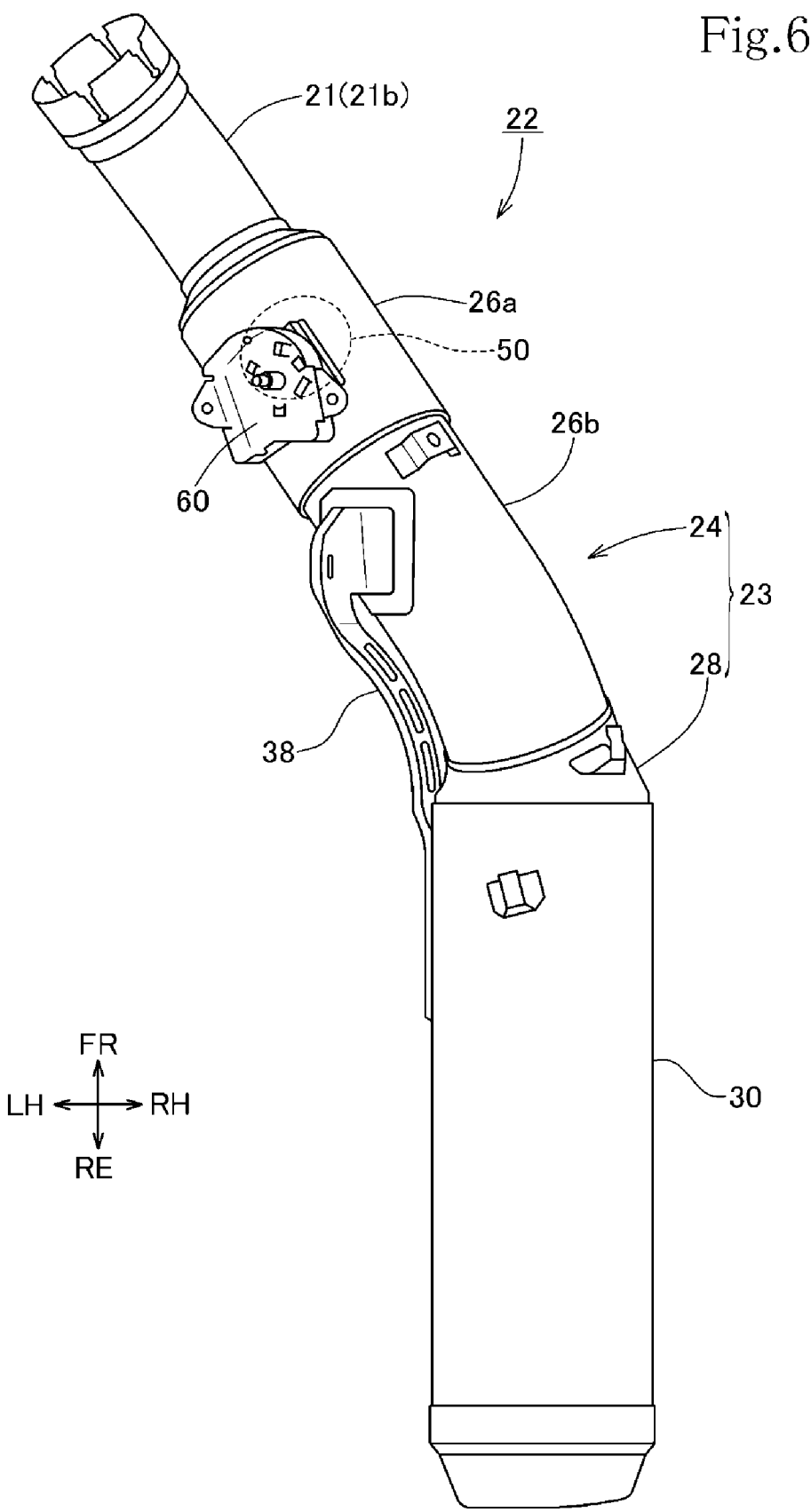
FIG. 6 is a plan view of the exhaust device.
Figure 7:
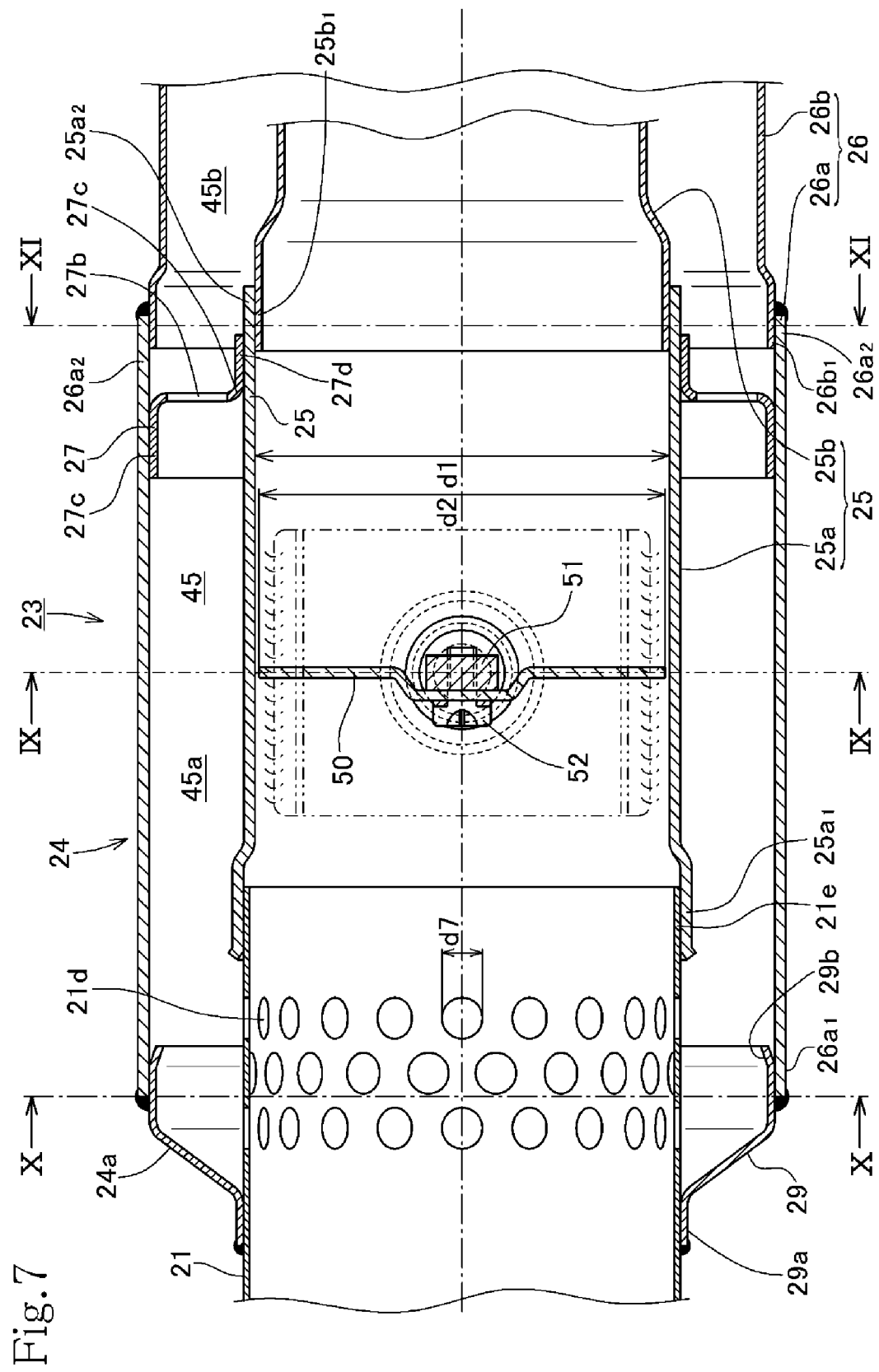
FIG. 7 is a fragmentary horizontal sectional view of a first muffler section.
Figure 8:
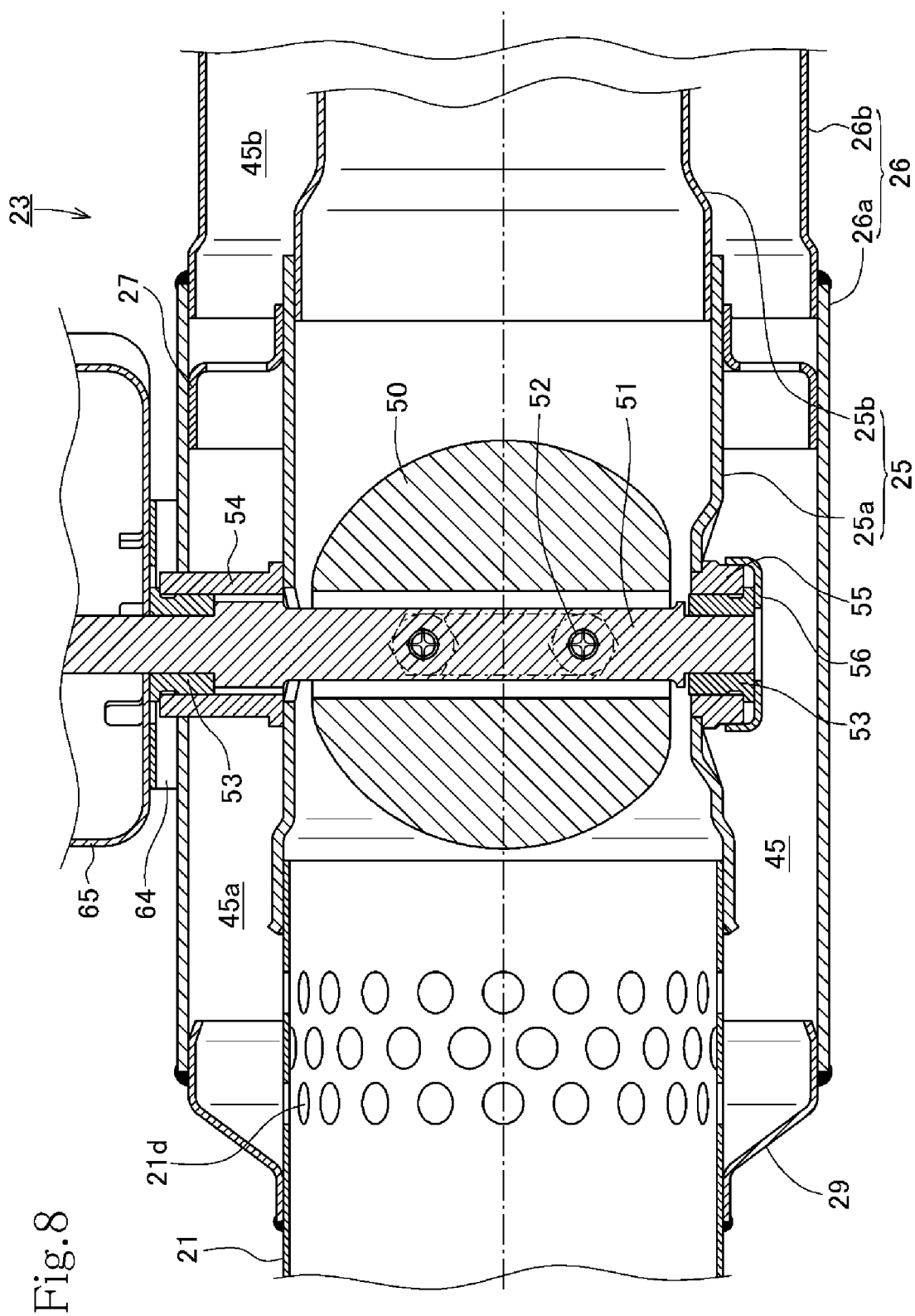
FIG. 8 is a fragmentary vertical sectional view of the first muffler section.

As depicted in FIGS. 1 and 4, the exhaust device 20 includes the exhaust pipe 21 connected to a rear end of the exhaust manifold 19 for receiving burned exhaust gases from the internal combustion engine E, and the exhaust muffler 22 for silencing exhaust gases delivered from the exhaust pipe 21. As depicted in FIGS. 4, 5, and 7, the exhaust muffler 22 has an upstream end connected to a downstream end of the exhaust pipe 21. As depicted in FIG. 1, the exhaust muffler 22 is in an attitude extending obliquely rearward and upward with respect to the motorcycle 1 on which the exhaust muffler 22 is mounted.

Figure 2:
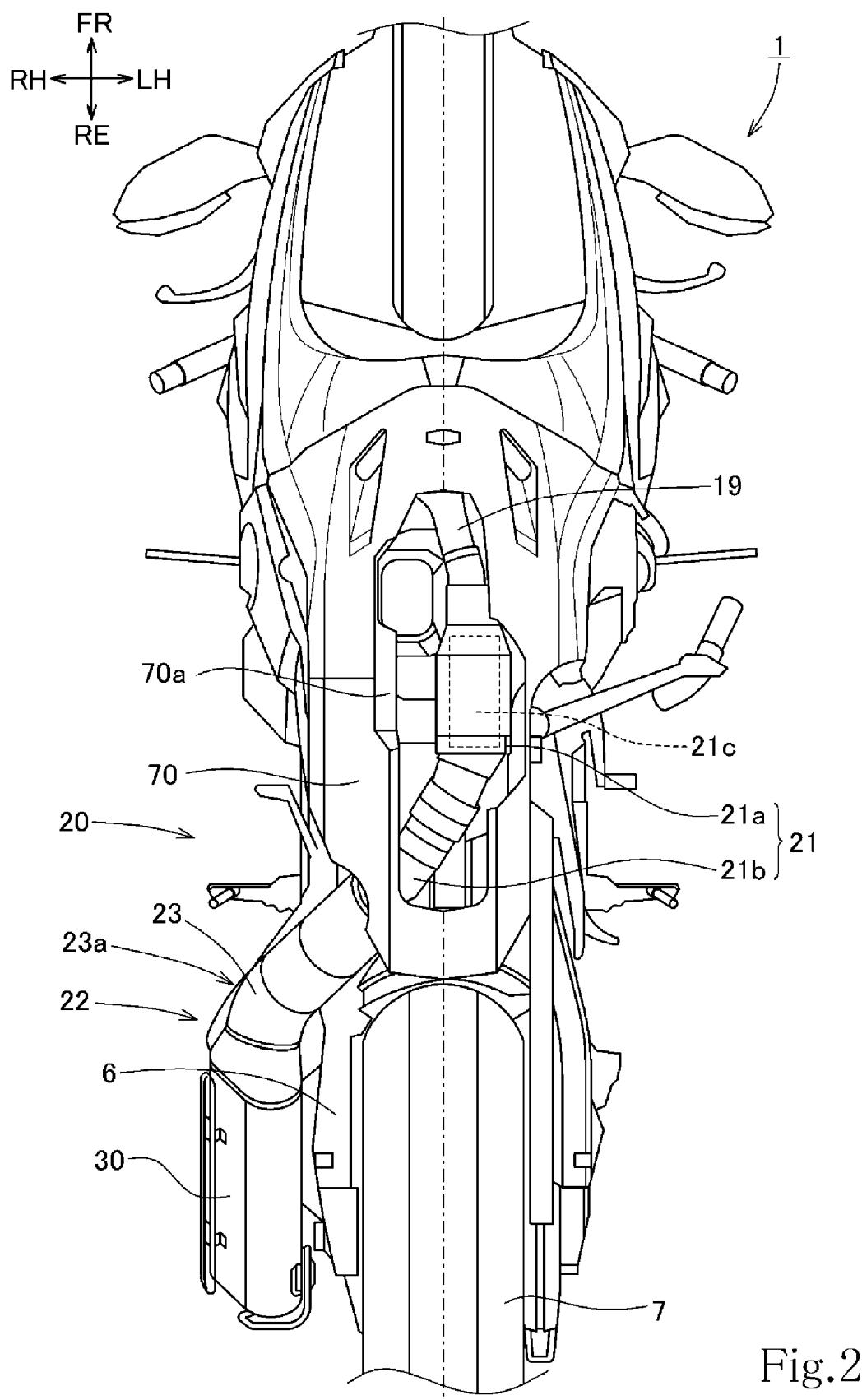
FIG. 2 is a bottom view of the motorcycle depicted in FIG. 1.

As depicted in FIG. 1, the exhaust pipe 21 connected to the first muffler section 23 is positioned below the internal combustion engine E and includes an upstream exhaust pipe 21a and a downstream exhaust pipe 21b. The upstream exhaust pipe 21a houses therein a catalytic device 21c for purifying exhaust gases. As depicted in FIG. 2, which is a bottom view of the vehicle, the exhaust pipe 21 is inclined from the left side in the widthwise directions of the vehicle across the center of the vehicle toward the right side of the vehicle where the first muffler section 23 is disposed, and the catalytic device 21c is offset to the left side in a widthwise direction. The catalytic device 21c has its upper and left sides surrounded by the internal combustion engine E. The cowl 70 has an opening 70a defined in a lower portion thereof, and the catalytic device 21c is positioned in the opening 70a as seen from the bottom view of the vehicle.

As depicted in FIG. 5, the exhaust muffler 22 has its interior divided, by a first partition wall 34 and a second partition wall 35, into a first expansion chamber 45, a third expansion chamber 47, and a second expansion chamber 46 that are arranged successively from the front. To the downstream end 21e of the exhaust pipe 21, there are successively connected an inner pipe 25 of the first muffler section 23, to be described below, through which exhaust gases from the exhaust pipe 21 flow, and an exhaust passage pipe 31 of the second muffler section 30. The inner pipe 25 and the exhaust passage pipe 31 are of a hollow cylindrical shape extending through the expansion chambers 45, 46, and 47 in the exhaust muffler 22 to a rear end of the exhaust device 20, and has a diameter that remains essentially the same from the front end of the inner pipe 25 to the rear end of the exhaust passage pipe 31. The exhaust muffler 22 is thus made up of a plurality of layers including the inner pipe 25, the exhaust passage pipe 31, and the expansion chambers 45, 46, and 47 provided around the outer periphery of the exhaust passage pipe 31. Furthermore, an exhaust valve 50 for switching between flow passageways for exhaust gases by opening and closing the inner pipe 25 is disposed in the inner pipe 50.

As depicted in FIGS. 5 and 7, the first muffler section 23 includes a double-walled tubular member 24 connected to the exhaust pipe 21, a connector 28 connecting the tubular member 24 and the second muffler section 30 to each other, a front cover 29 that closes a front end of the first muffler section 23, an annular plate member 27 disposed in the tubular member 24, and the exhaust valve 50.

Figure 17:
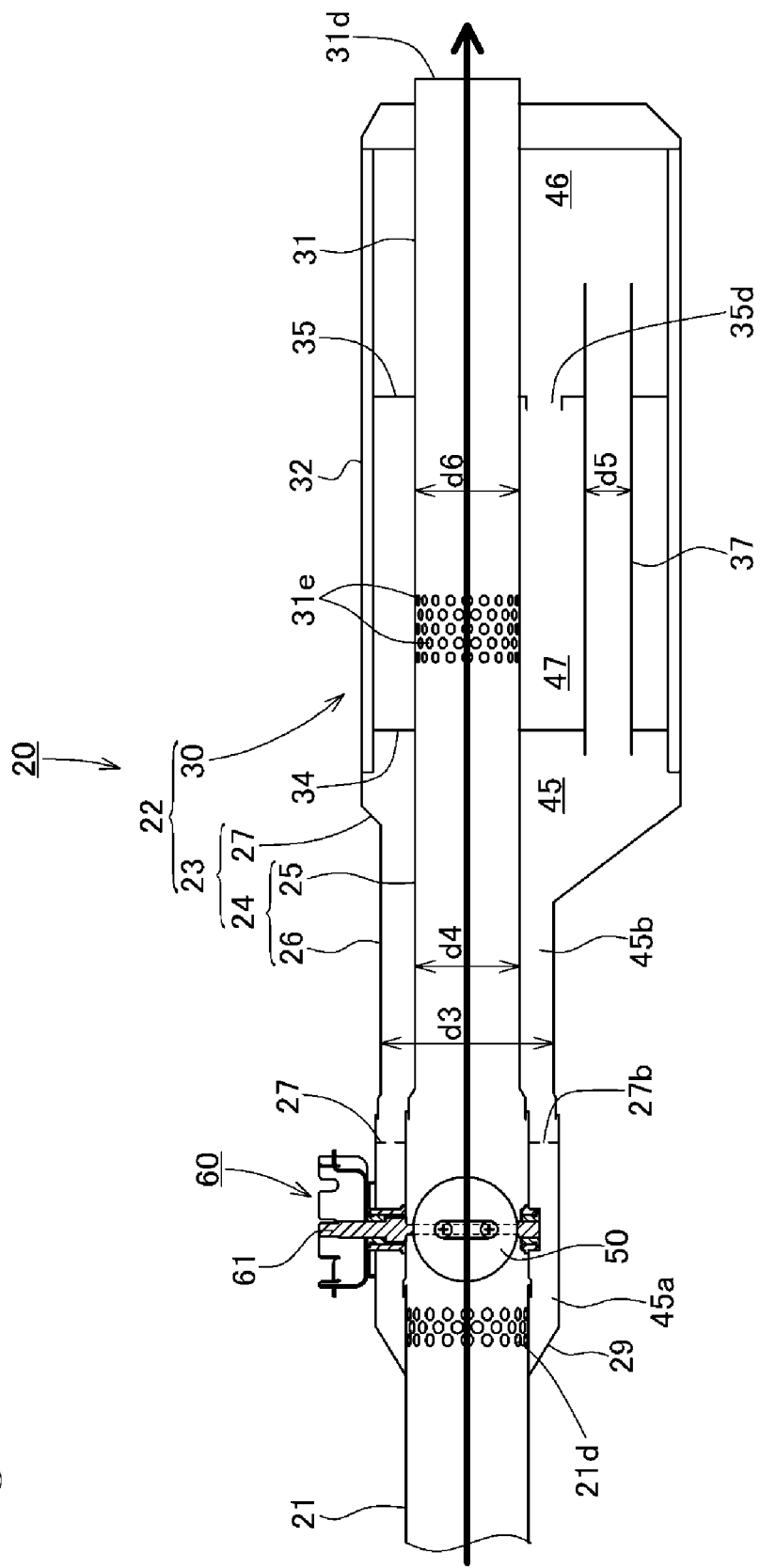
FIG. 17 is a schematic view of an exhaust muffler device, depicting a flow of exhaust gases while the exhaust valve is open.

The tubular member 24 includes the inner pipe 25 connected to the exhaust pipe 21 and an outer pipe 26 covering the inner pipe 25. The inner pipe 25 and the outer pipe 26 are double-walled pipes disposed substantially concentrically with each other. As depicted in FIG. 17, the outer pipe 26 has an inside diameter d3 which is in the range from 1.5 to 2.0 times an inside diameter d4 of the inner pipe 25.

As depicted in FIGS. 5 and 7, the inner pipe 25 is made up of a plurality of divided pipes including a first divided inner pipe 25a positioned upstream and connected to the exhaust pipe 21 and a second divided inner pipe 25b connected to the downstream end $25a_2$ of the first divided inner pipe 25a. The first divided inner pipe 25a and the second divided inner pipe 25b are of substantially the same diameter. The downstream end 21e of the exhaust pipe 21 is fitted in an upstream end $25a_1$ of the first divided inner pipe 25a, and an upstream end $25b_1$ of the second divided inner pipe 25b is fitted in the downstream end $25a_2$ of the first divided inner pipe 25a. These fitted ends are not welded, but are telescopically connected to each other.

The outer pipe 26 is made up of a plurality of divided pipes including a first divided outer pipe 26a positioned upstream and a second divided outer pipe 26b connected by welding to the downstream end $26a_2$ of the first divided outer pipe 26a. An upstream end $26b_1$ of the second divided outer pipe 26b is fitted in the downstream end $26a_2$ of the first divided outer pipe 26a. These fitted ends are fixed to each other by welding. As depicted in FIG. 5, a downstream end $26b_2$ of the second divided outer pipe 26b is connected to an upstream end 28a of the connector 28 and fixed thereto by welding.

The front cover 29 closing the gap between an upstream end $26a_1$ of the first divided outer pipe 26a and the exhaust pipe 21 has, as depicted in FIG. 7, an upstream end 29a that is of the same diameter as the outside diameter of the exhaust pipe 21, is progressively larger in diameter toward downstream side, and has a downstream end 29b that is of the same diameter as the upstream end of the first divided outer pipe 26a. The upstream end 29a of the front cover 29 is connected to the downstream end 21e of the exhaust pipe 21 and fixed thereto by welding, and the downstream end 29b of the front cover 29 is connected to the upstream end $26a_1$ of the first divided outer pipe 26a and connected thereto by welding.

As shown in FIG. 5, the first divided inner pipe 25a and the second divided outer pipe 26a are of a straight shape, and the second divided inner pipe 25b and the second divided outer pipe 26b are of a gradually curved shape. The inner pipe 25 and the outer pipe 26 are disposed substantially concentrically with each other. The first expansion chamber 45 is defined between the inner pipe 25 and the outer pipe 26 of the first muffler section 23.

Figure 11:
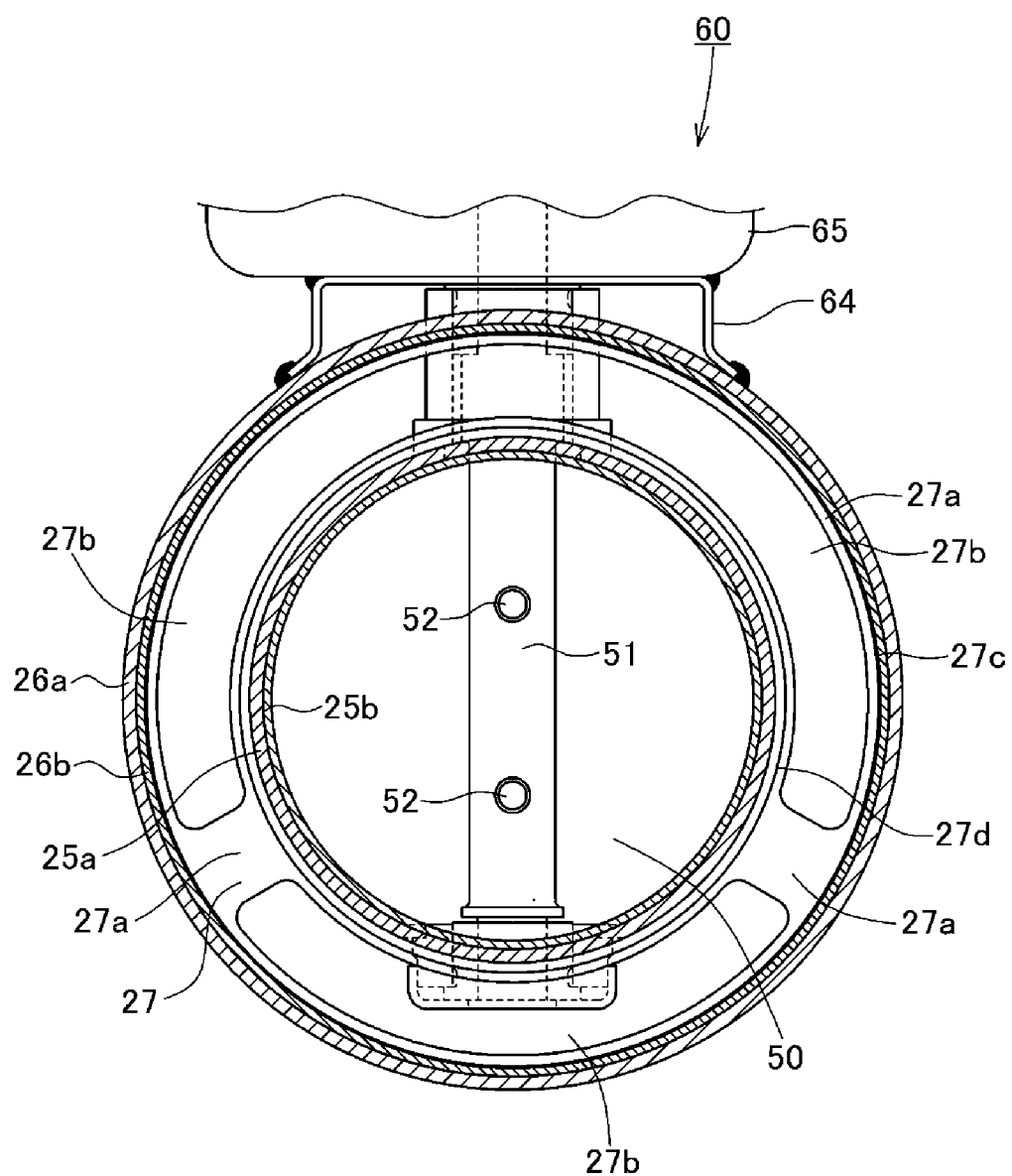
FIG. 11 is a cross-sectional view taken along line XI-XI of FIG. 7, depicting the valve actuator in the upper position.

As depicted in FIG. 7, the annular plate member 27 is fixed to an outer circumferential surface of the inner pipe 25 and an inner circumferential surface of the outer pipe 26, and divides the first expansion chamber 45 into a first compartment 45a and a second compartment 45b. As shown in FIG. 11, the annular plate member 27 includes a ring-shaped annular plate 27a having an outside diameter that is the same as the inside diameter of the first divided outer pipe 26a and an inside diameter that is the same as the outside diameter of the first divided inner pipe 25a inserted in the annular plate 27a. The annular plate 27a has a plurality of (two in the present embodiment) fluid communication holes 27b defined therein that provide fluid communication between the first compartment 45a and the second compartment 45b of the first expansion chamber 45. The fluid communication holes 27b are shaped as oblong holes along the circumferential directions of the annular plate 27a. One of the fluid communication holes 27b which is defined in an upper portion of the annular plate 27a is of a length that is approximately two thirds of the circumferential length of the annular plate 27a, whereas the other fluid communication hole 27b which is defined in a lower portion of the annular plate 27a is of a length that is approximately one third of the circumferential length of the annular plate 27a. As depicted in FIG. 7, the annular plate 27a includes a fixing flange 27c extending rearward from an outer circumferential edge of the annular plate 27a perpendicularly to the annular plate 27a and having a predetermined width, and a fixing flange 27d extending forward from an inner circumferential edge of the annular plate 27a perpendicularly to the annular plate 27a and having a predetermined width.

As depicted in FIG. 7, the fixing flange 27c of the annular plate member 27 is held in abutment against and fixed to an inner circumferential surface of a downstream portion of the first divided outer pipe 26a, and the fixing flange 27d thereof is held in abutment against and fixed to an outer circumferential surface of a downstream portion of the first divided inner pipe 25a. The annular plate member 27 is fixedly disposed in the first divided outer pipe 26a such that its plane lies perpendicularly to the longitudinal directions of the first divided outer pipe 26a. The downstream portions of the first divided outer and inner pipes 26a and 25a that are disposed as inner and outer double-walled pipes have respective inner and outer wall surfaces integrally connected to each other by the annular plate member 27 in a manner to close the gap therebetween.

Figure 9:
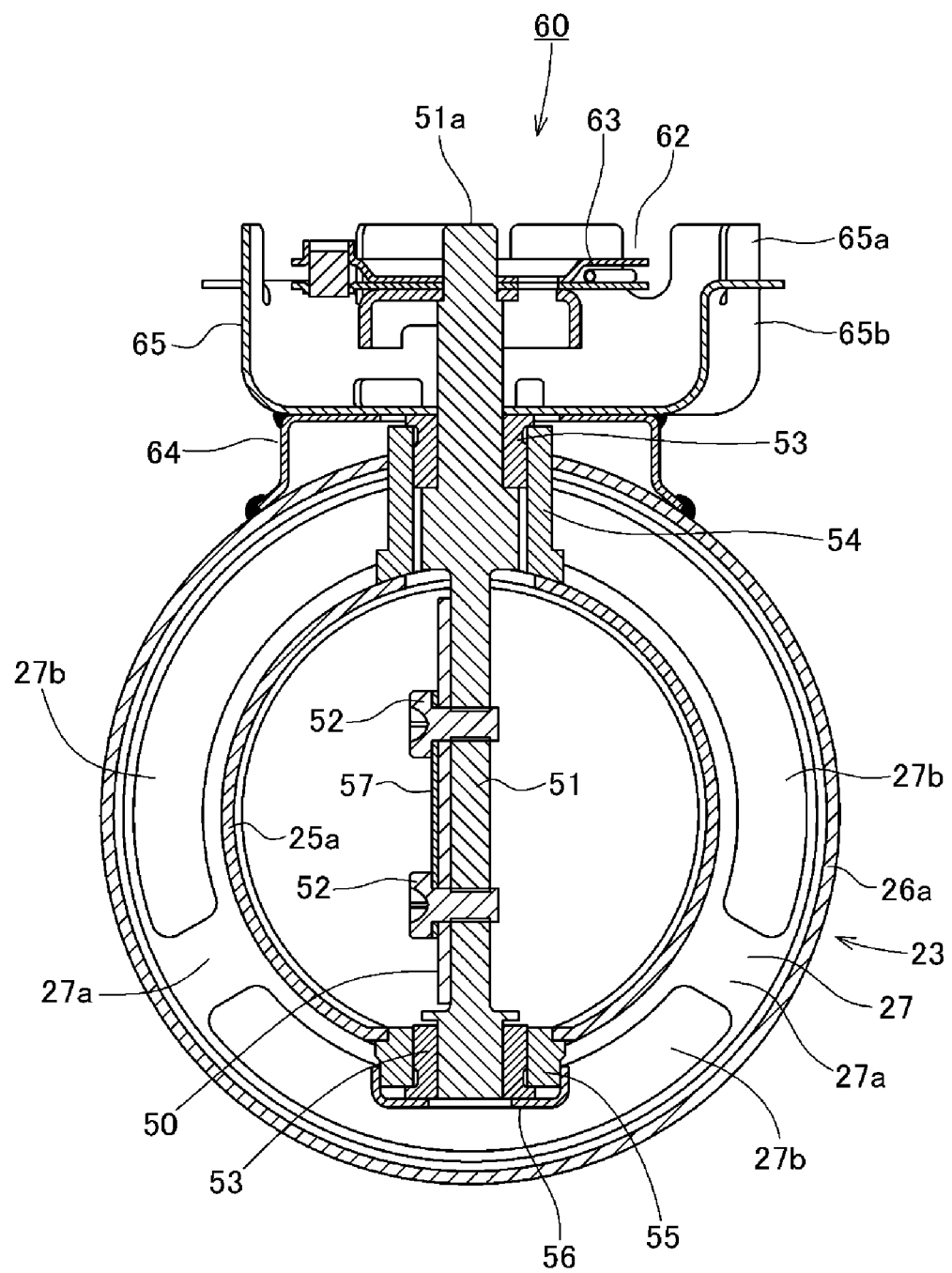
FIG. 9 is a cross-sectional view taken along line IX-IX of FIG. 7, depicting an exhaust valve in an open state with a valve actuator in an upper position.
Figure 10:
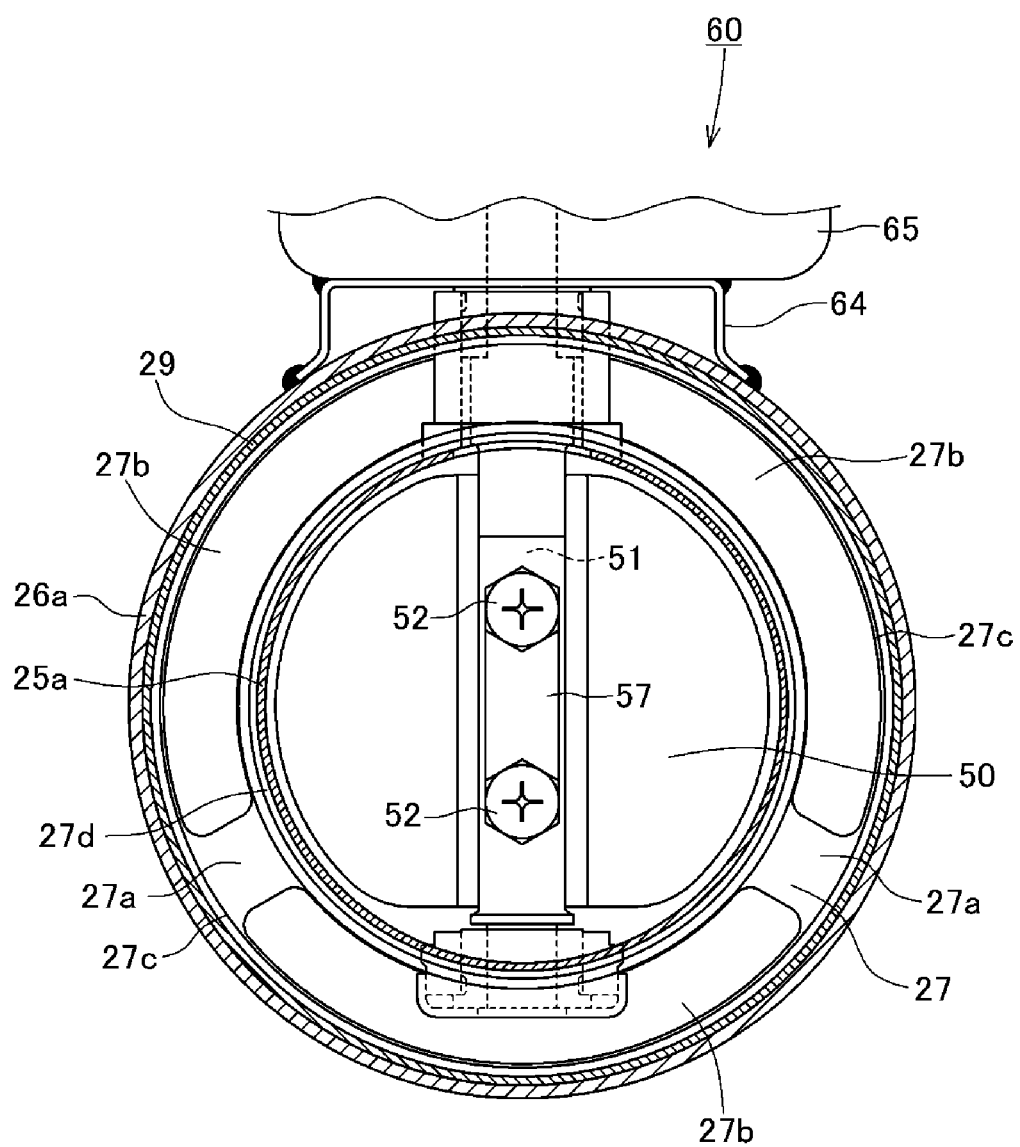
FIG. 10 is a cross-sectional view taken along line X-X of FIG. 7, depicting the valve actuator in the upper position.

As depicted in FIGS. 5, 7, and 9, the exhaust valve 50 for opening and closing the inner pipe 25 for changing an amount of exhaust gases discharged from first through holes 21d, to be described later, into the first expansion chamber 45 is provided in the first divided inner pipe 25a of the inner pipe 25 that is positioned upstream. The exhaust valve 50 is controlled for its opening and closing operation depending on the output power of the internal combustion engine E. The exhaust valve 50 serves as a device for silencing exhaust gases by changing flow passageways for the exhaust gases to expand the exhaust gases, and also for adjusting the characteristics of the internal combustion engine E by applying a back pressure to the exhaust gases. As depicted in FIG. 7, the exhaust valve 50 is disposed in a region of the exhaust muffler 22 where the first divided inner pipe 25a and the first divided outer pipe 26a are provided as the inner and outer double-walled pipes, and is positioned upstream of the annular plate member 27 with respect to the direction along which the exhaust gases flow. As depicted in FIG. 5, the exhaust valve 50 is of a disk shape whose outer edge extends along an inner circumferential surface of the first divided inner pipe 25a. As shown in FIG. 7, the exhaust valve 50 has an outside diameter d2 smaller than an inside diameter d1 of the first divided inner pipe 25a, allowing a very small amount of exhaust gases upstream of the exhaust valve 50 to pass through the gap between the exhaust valve 50 and the first divided inner pipe 25a to a downstream side of the exhaust valve 50 even when the exhaust valve 50 is closed.

As depicted in FIGS. 9 through 12, the exhaust valve 50 includes an exhaust valve shaft 51 fastened thereto by a pair of screws 52 with a washer 57 interposed therebetween. The exhaust valve shaft 51 is coupled to a valve actuator 60 that opens and closes the exhaust valve 50. As depicted in FIG. 5, the exhaust valve shaft 51 extends through an outer surface of the first divided outer pipe 26a of the first muffler section 23 of the exhaust muffler 22, and the valve actuator 60 is disposed on an outer side surface of the exhaust muffler 22. As FIG. 9 shows, the exhaust valve shaft 51 is angularly movably supported by bearings 53 on an upper support member 54 mounted on an upper portion of the first divided inner pipe 25a and a lower support member 55 mounted on a lower portion of the first divided inner pipe 25a. A cap 56 for preventing the exhaust valve shaft 51 from coming off is attached to a lower surface of the lower support member 55.

Figure 12:
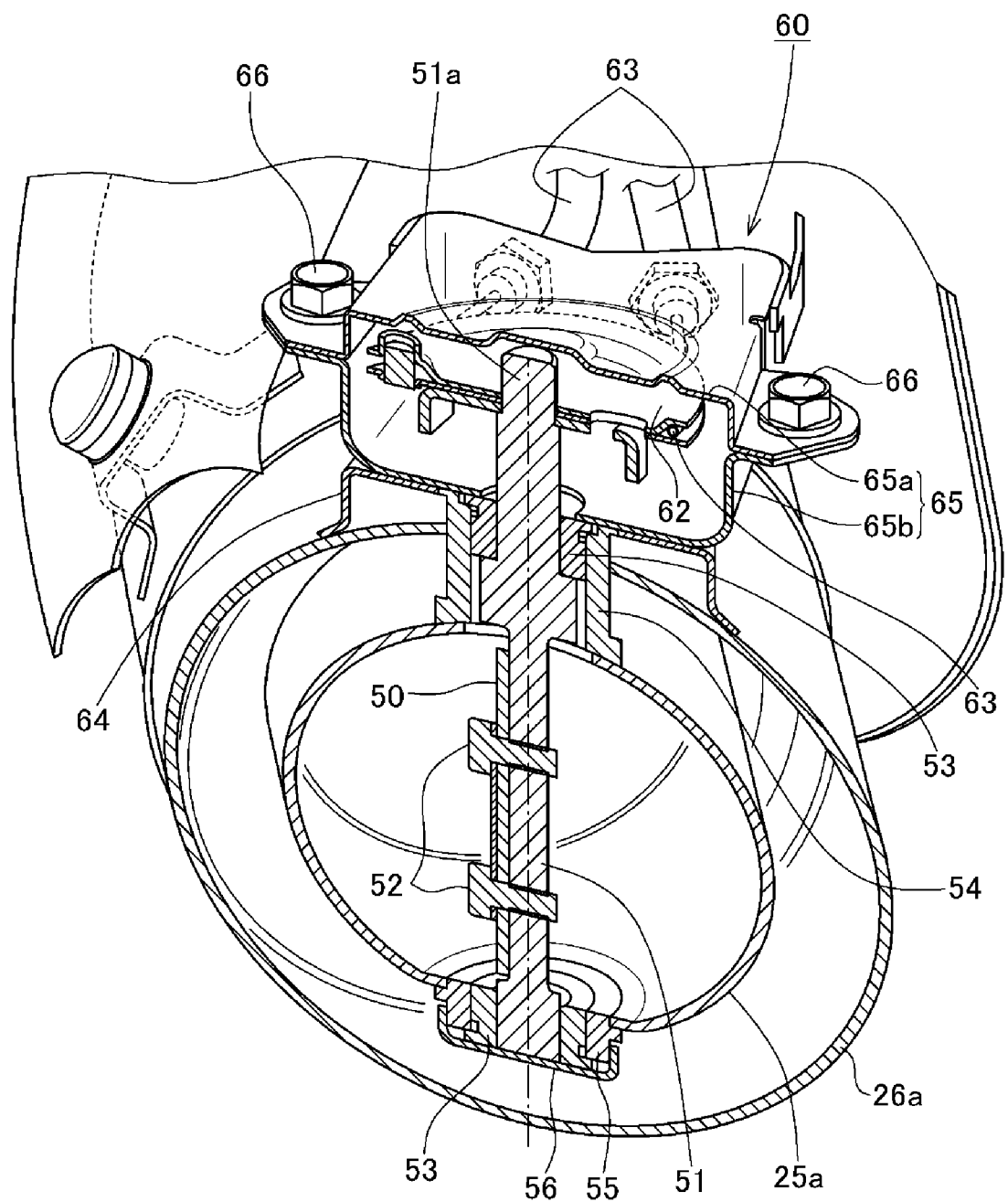
FIG. 12 is a perspective view of the first muffler section partly cut away along a plane lying along the axis about which the exhaust valve is actuated.

As depicted in FIGS. 9 and 12, the exhaust valve shaft 51 has an upper portion 61a extending upward through upper portions of the first divided inner pipe 25a and the first divided outer pipe 26a. A pulley 62 is mounted on the upper portion 51a of the exhaust valve shaft 51 for angular movement in unison therewith, and a drive wire 63 is trained around the pulley 62. When the drive wire 63 is pulled by a drive device, not depicted, the exhaust valve shaft 51 is angularly moved about its own axis, opening and closing the exhaust valve 50 in the first divided inner pipe 25a. The pulley 62 has its peripheral area covered with a case 65 that is made up of an upper case body 65a and a lower case body 65b which are integrally fastened to each other by a pair of bolts 66. The case 65 is supported on a base 64 welded to an outer surface of the first divided outer pipe 26a.

Figure 3:
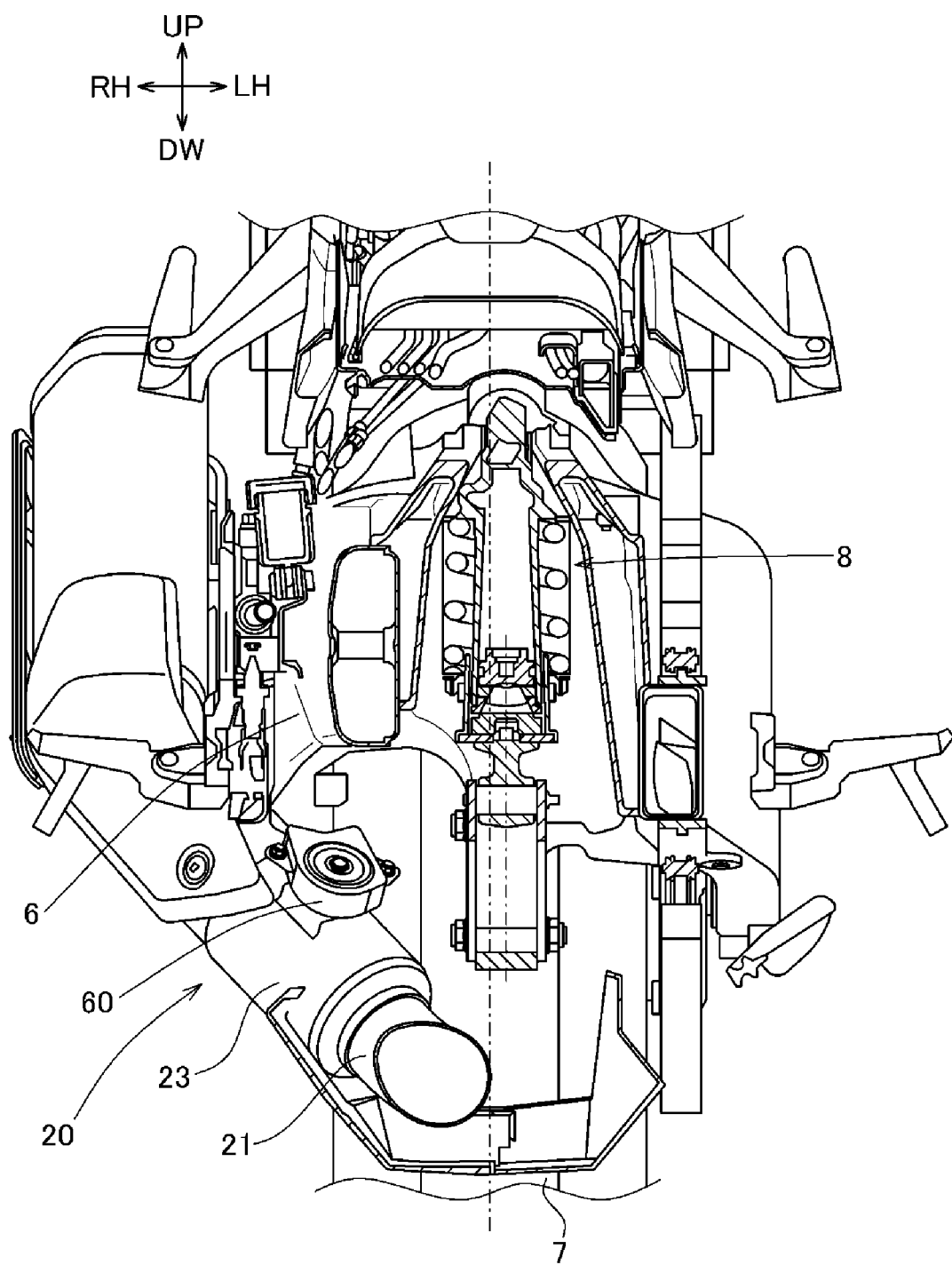
FIG. 3 is a cross-sectional view taken along line III-III in FIG. 1.

As depicted in FIG. 1, the valve actuator 60 for actuating the exhaust valve 50 is disposed behind the vehicle body frame 2. As depicted in FIG. 3, the valve actuator 60 is disposed below the swing arm 6 and above the first muffler section 23 in the widthwise directions of the vehicle. As the valve actuator 60 is surrounded by the vehicle body frame 2 and the swing arm 6, it is protected without a dedicated cover provided therefor.

As shown in FIG. 7, the exhaust pipe 21 has the plurality of first through holes 21d defined therein between an area where the front cover 29 is welded to the exhaust pipe 21 and an area where the exhaust pipe 21 is connected to the first divided inner pipe 25a. The through holes 21d provide fluid communication between the inside of the first divided inner pipe 25a and the first expansion chamber 45. The first through holes 21d have a diameter d7 of 6 mm each, for example, and are arranged in three rows along the longitudinal directions of the exhaust pipe 21, each row including 20 first through holes 21d arranged in the circumferential directions of the exhaust pipe 21. When the exhaust valve 50 closes the inner pipe 25, exhaust gases flowing from the exhaust pipe 21 into the inner pipe 25 pass through the first through holes 21d and flow into the first compartment 45a of the first expansion chamber 45.

The first through holes 21d are positioned upstream of an area at one half of the distance between the upstream end of the first muffler section 23 and the exhaust valve shaft 51 of the valve 50 in the direction of a flow of exhaust gases in the first muffler section 23.

As depicted in FIG. 5, the first muffler section 23 includes the tubular member 24 made up of the inner pipe 25 and the outer pipe 26 and the connector 28 that connects the second muffler section 30, to be described later, to the tubular member 24. The upstream end 28a of the connector 28 is of substantially the same diameter as the diameter of the downstream end 28b2 of the second divided outer pipe 26b. The connector 28 is progressively larger in diameter toward downstream side, and has a downstream end 28b that is of substantially the same diameter as the outside diameter of the second muffler section 30. The connector 28 and the second muffler section 30 are connected and fixed to each other.

As depicted in FIG. 1, the first muffler section 23 of the exhaust muffler 22 is curved vertically as depicted in side elevation. As depicted in FIG. 3, the first muffler section 23 has at least a portion disposed below the swing arm 6 in the widthwise directions of the vehicle, and extends outward from the position below the swing arm 6. As depicted in plan in FIG. 6, the tubular member 24 of the first muffler section 23 has a curved portion 23a between the area where the exhaust valve 50 is disposed and the connector 28. As depicted in FIG. 2, the curved portion 23a of the tubular member 24 is curved in the transverse directions of the vehicle outwardly of the swing arm 6 such that the second muffler section 30 in a rear portion of the exhaust muffler 22 lies along the longitudinal directions of the vehicle.

As FIG. 5 shows, the second muffler section 30 is connected to a rear portion of the first muffler section 23. The second muffler section 30 includes a second muffler body 32 serving as an outer shell of the second muffler section 30, the first partition wall 34 and the second partition wall 35 that divide the interior of the second muffler body 32, a rear wall 36 that closes a downstream end of the second muffler body 32, the exhaust passage pipe 31 connected to a downstream end of the inner pipe 25 of the first muffler section 23, extending through the first partition wall 34, the second partition wall 35, and the rear wall 36, and held in fluid communication with the ambient air, and a fluid communication pipe 37 extending through the first partition wall 34 and the second partition wall 35 and providing fluid communication between the first expansion chamber 45 and the second expansion chamber 46. As depicted in FIG. 17, the fluid communication pipe 37 has an inside diameter d5 equal to or smaller than one half of an inside diameter d6 of the exhaust passage pipe 31.

Figure 13:
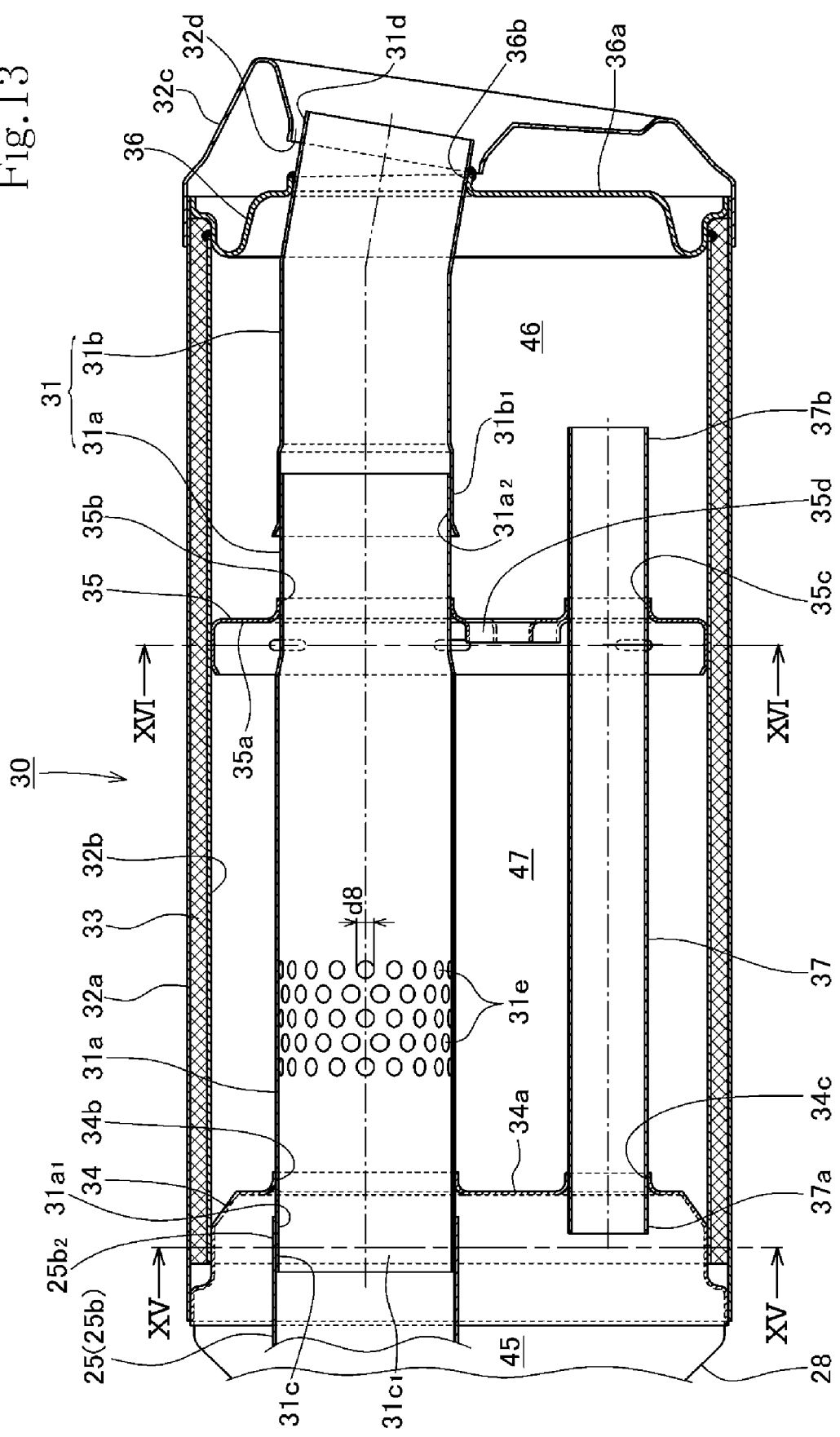
FIG. 13 is a sectional view of a second muffler section taken along line XIII-XIII of FIG. 16.
Figure 14:
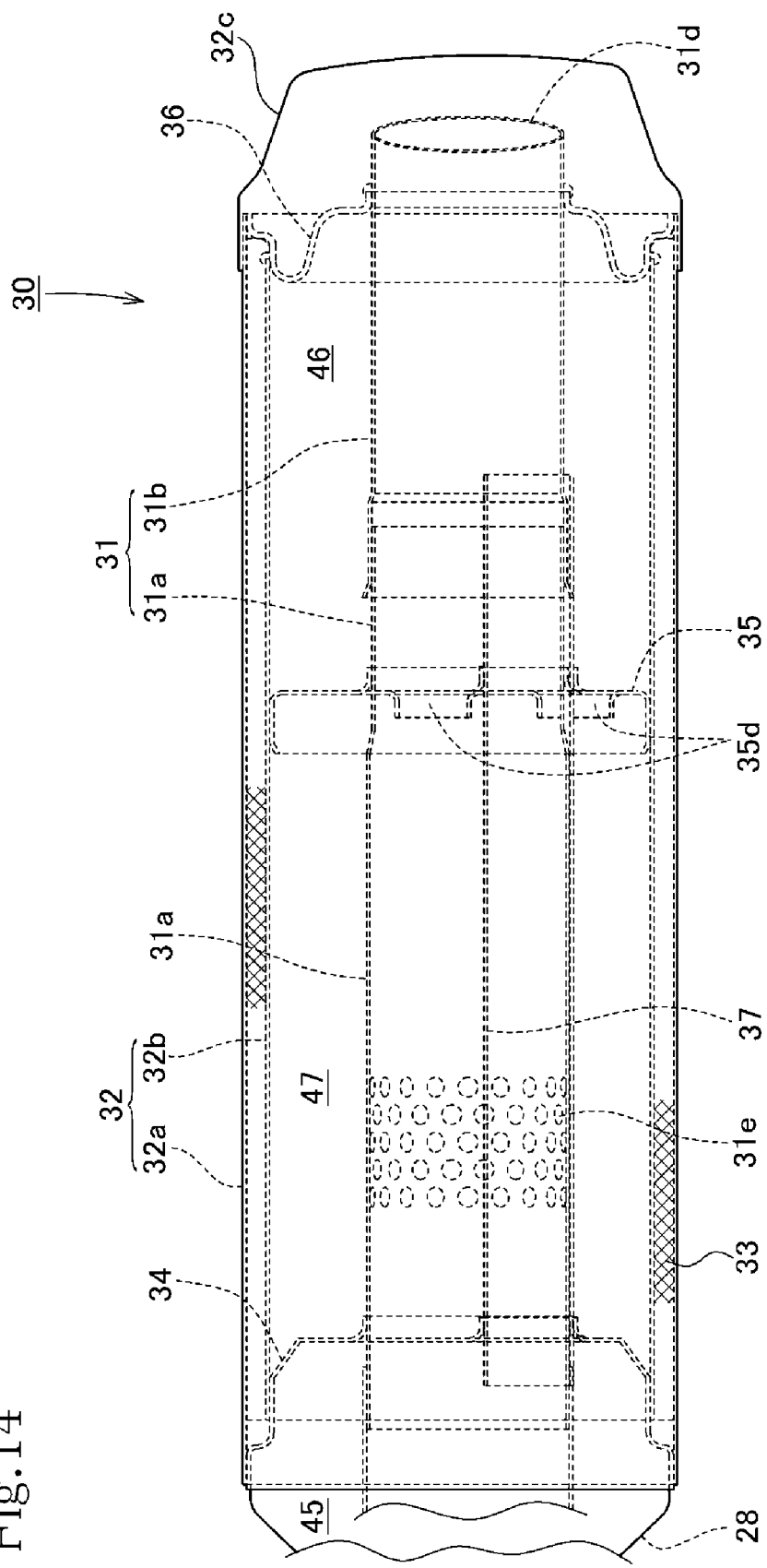
FIG. 14 is a plan view of a rear muffler section.

FIG. 13 depicts the second muffler section 30 in vertical section, and FIG. 14 depicts the second muffler section 30 in plan. The second muffler body 32 includes a tubular outer body 32a and an inner body 32b disposed in the outer body 32a with a predetermined gap therebetween. The gap between the outer body 32a and the inner body 32b is filled up with a filling material 33 such as glass wool or the like for heat insulation and sound absorption. A tail cover 32c is mounted on a downstream end of the outer body 32a and has an exhaust passage pipe insertion hole 32d defined therein. As shown sin FIGS. 15 and 16, the second muffler body 32 is of a non-circular cross-sectional shape perpendicular to the flow of exhaust gases in the second muffler body 32, which is vertically elongate, widest at a portion slightly above its center, and progressively narrower in a downward direction.

As depicted in FIGS. 5 and 13, the exhaust passage pipe 31 disposed in the second muffler body 32 is made up of a first exhaust passage pipe 31a connected to a downstream end $25b_2$ of the second divided inner pipe 25b of the first muffler section 23 and a second exhaust passage pipe 31b connected to a downstream end of the first exhaust passage pipe 31a. The second exhaust passage pipe 31b has a downstream end, i.e., the exhaust passage pipe 31 has a downstream end 31d, inserted in the exhaust passage pipe insertion hole 32d in the tail cover 32c and held in fluid communication with the ambient air.

An upstream end $31a_1$ of the first exhaust passage pipe 31a and the downstream end $25b_2$ of the second divided inner pipe 25b are of substantially the same diameter, and the downstream end $25b_2$ of the second divided inner pipe 25b is fitted over the upstream end $31a_1$ of the first exhaust passage pipe 31a. These fitted ends are not welded, but are telescopically connected to each other.

An upstream end $31b_1$ of the second exhaust passage pipe 31b and a downstream end $31a_2$ of the first exhaust passage pipe 31a are of substantially the same diameter, and the downstream end $31a_2$ of the first exhaust passage pipe 31a is fitted in the upstream end $31b_1$ of the second exhaust passage pipe 31b. These fitted ends are not welded, but are telescopically connected to each other.

Figure 15:
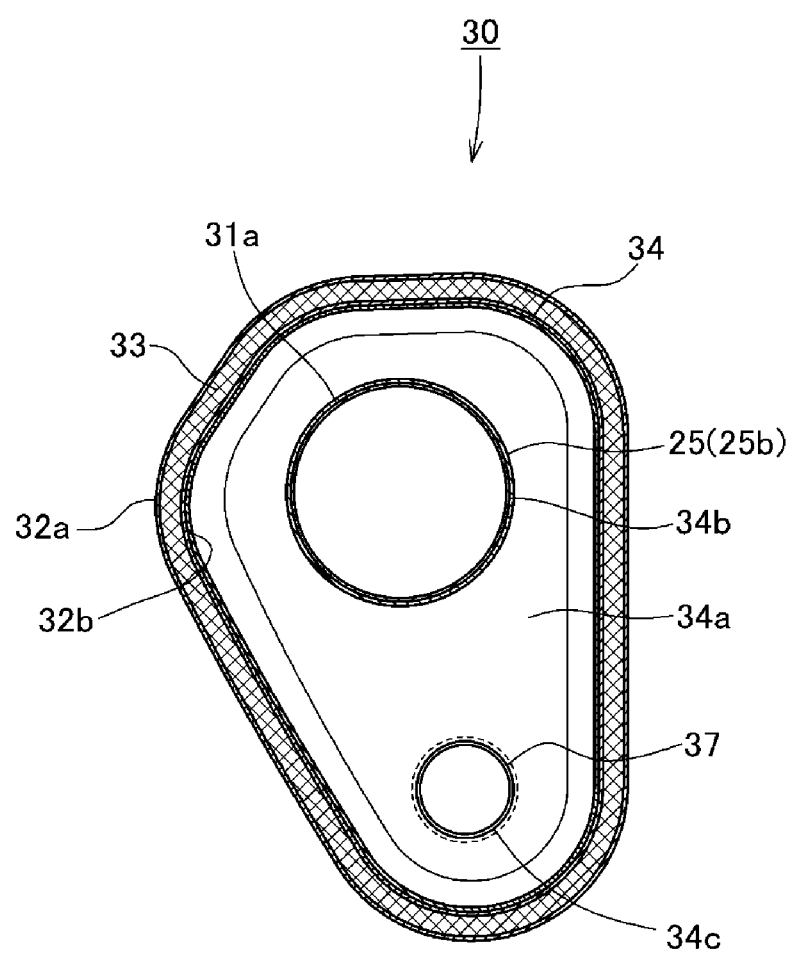
FIG. 15 is a cross-sectional view taken along line XV-XV of FIG. 13.
Figure 16:
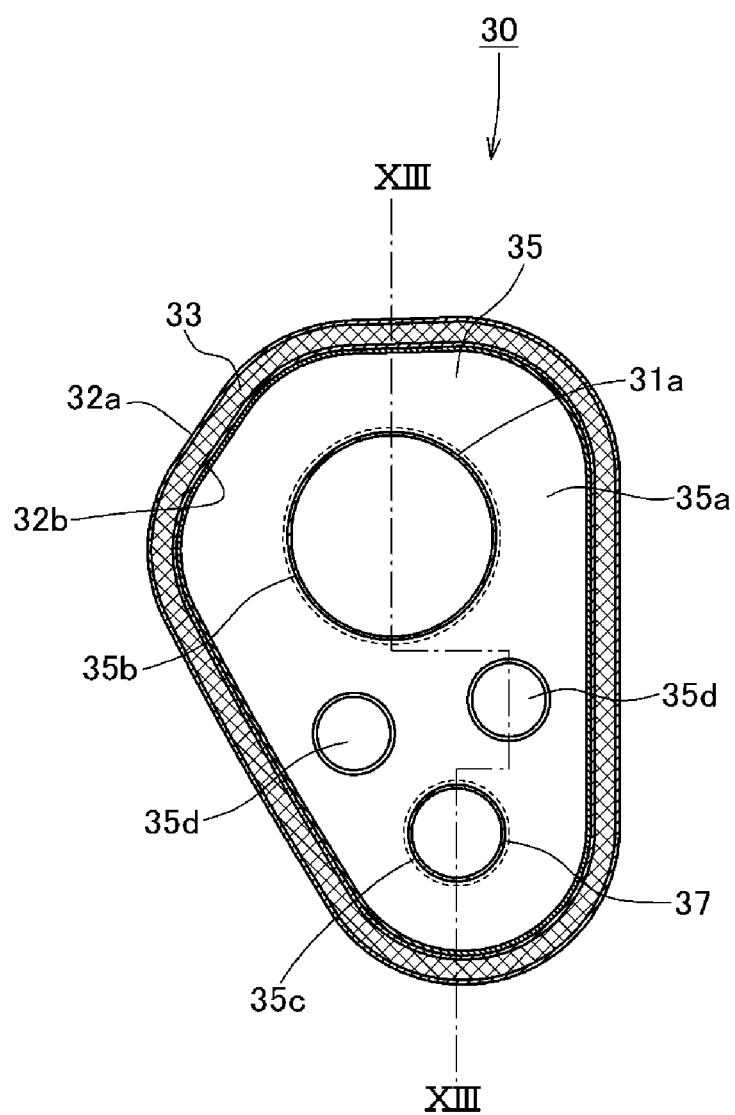
FIG. 16 is a cross-sectional view taken along line XVI-XVI of FIG. 13.

As depicted in FIGS. 5, 13, and 17, the exhaust muffler 22 has its interior divided, by the first partition wall 34 and the second partition wall 35, into the first expansion chamber 45, the third expansion chamber 47, and the second expansion chamber 46 that are arranged successively from the front. As depicted in FIG. 15, the first partition wall 34 has an exhaust passage pipe insertion hole 34b defined in an upper portion of a wall 34a thereof for insertion of the first exhaust passage pipe 31a therein and a fluid communication pipe insertion hole 34c defined in a lower portion of the wall 34a for insertion of the fluid communication pipe 37 therein. As depicted in FIG. 16, the second partition wall 35 has an exhaust passage pipe insertion hole 35b defined in an upper portion of a wall 35a thereof for insertion of the first exhaust passage pipe 31a therein, a fluid communication pipe insertion hole 35c defined in a lower portion of the wall 35a for insertion of the fluid communication pipe 37 therein, and a pair of left and right fluid communication holes 35d defined therein vertically between the exhaust passage pipe insertion hole 35b and the fluid communication pipe insertion hole 35c for providing fluid communication between the second expansion chamber 46 and the third expansion chamber 47. As depicted in FIG. 13, the first partition wall 34 and the second partition wall 35 are fixedly mounted in the second muffler body 32.

The exhaust passage pipe 31 is inserted in the exhaust passage pipe insertion holes 34b, 35b, and 36b in the first partition wall 34, the second partition wall 35, and the rear wall 36 and fixed to and supported by the first partition wall 34, the second partition wall 35, and the rear wall 36. The fluid communication pipe 37 is inserted in the fluid communication pipe insertion holes 34c and 35c in the first partition wall 34 and the second partition wall 35 and fixed to and supported by the first partition wall 34 and the second partition wall 35.

As depicted in FIGS. 5 and 17, the first expansion chamber 45 includes a space defined between the inner pipe 25, the outer pipe 26, and the connector 28 of the first muffler section 23, and a space surrounded by the second muffler body 32 of the second muffler section 30 and an upstream surface of the first partition wall 34. The second expansion chamber 46 includes a space surrounded by the second muffler body 32, the second partition wall 35, and the rear wall 36 of the second muffler section 30. The third expansion chamber 47 includes a space surrounded by the second muffler body 32, the first partition wall 34, and the second partition wall 35 of the second muffler section 30. The second muffler section 30 has a cross-sectional area larger than a cross-sectional area of the tubular member 24 of the first muffler section 23. The first expansion chamber 45 has a length larger than respective lengths of the second expansion chamber 46 and the third expansion chamber 47 in the direction of a flow of exhaust gases in the exhaust pipe 21, the inner pipe 25, and the exhaust passage pipe 31.

As shown in FIG. 13, the exhaust passage pipe 31 has an upstream end 31c that is open, providing a first opening $31c_1$ held in fluid communication with the inner pipe 25. The first exhaust passage pipe 31a of the exhaust passage pipe 31 has a plurality of second through holes 31e defined therein as a second opening at a position between a region where the first partition wall 34 is fixed and a region where the second partition wall 35 is fixed. The second through holes 31e provide fluid communication between the exhaust passage pipe 31 and the third expansion chamber 47. The second through holes 31e have a diameter d8 of 5 mm each, for example, and are arranged in five rows arrayed along the longitudinal directions of the exhaust passage pipe 31, each row including 19 second through holes 31e arranged in the circumferential directions of the exhaust passage pipe 31.

Since the diameters and numbers of the first through holes 21d and the second through holes 31e are set as described above, the diameter d7 of the first through holes 21d defined in the inner pipe 25 of the first muffler section 23 is larger than the diameter d8 of the second through holes 31e, and a total area A1 of the first through holes 21d is smaller than a total area A2 of the second through holes 31e.

The tubular member 24 of the first muffler section 23 is of a substantially circular cross-sectional shape, as depicted in FIGS. 5 and 9, and the second muffler section 30 is of a non-circular cross-sectional shape that is longer vertically and narrower horizontally, as depicted in FIGS. 15 and 16. As depicted in FIG. 4, the tubular member 24 of the first muffler section 23 has an outside diameter smaller than the outside diameter of the second muffler section 30 and has a constricted shape. The tubular member 24 of the first muffler section 23 and the second muffler section 30 are connected to each other by the connector 28 whose cross-sectional area is progressively larger from its front end to its rear end. The first expansion chamber 45 in the first muffler section 23 has an outside diameter smaller than the outside diameters of the second expansion chamber 46 and the third expansion chamber 47 in the second muffler section 30. As depicted in FIG. 5, the second expansion chamber 46 in the second muffler section 30 is disposed rearward and upward of the first muffler section 23, and the second expansion chamber 46 is larger in cross-sectional area than the first expansion chamber 45.

The tubular member 24 of the first muffler section 23 is disposed on a line segment L interconnecting the pivot shaft 2d and the rear wheel drive axle 6a at a point that is closer to the pivot shaft 2d than a point which is spaced from the pivot shaft 2d by a distance that is two thirds of the length of the line segment L.

The first muffler section 23 and the second muffler section 30 of the exhaust muffler 22 are sub-assembled separately and then assembled together.

Flows of exhaust gases in the exhaust device 20 according to the present embodiment will be described below with reference to FIGS. 17 and 18. FIG. 17 schematically depicts a flow of exhaust gases while the exhaust valve 50 is open. When the valve actuator 60 is operated to open the exhaust valve 50, exhaust gases emitted from the internal combustion engine E pass through the exhaust pipe 21, flow from the downstream end of the exhaust pipe 21 through the upstream end of the inner pipe 25 into the exhaust passage pipe 31, and then are discharged into the ambient air from the downstream end 31d of the exhaust passage pipe 31. Though some of the exhaust gases in the exhaust pipe 21 pass through the first through holes 21d into the first compartment 45a of the first expansion chamber 45, most of the exhaust gases are discharged from the downstream end 31d of the exhaust passage pipe 31. While the exhaust valve 50 is open, therefore, the exhaust gases are discharged directly from the exhaust passage pipe 31 into the ambient air, and do not reduce the output power of the internal combustion engine E.

Figure 18:
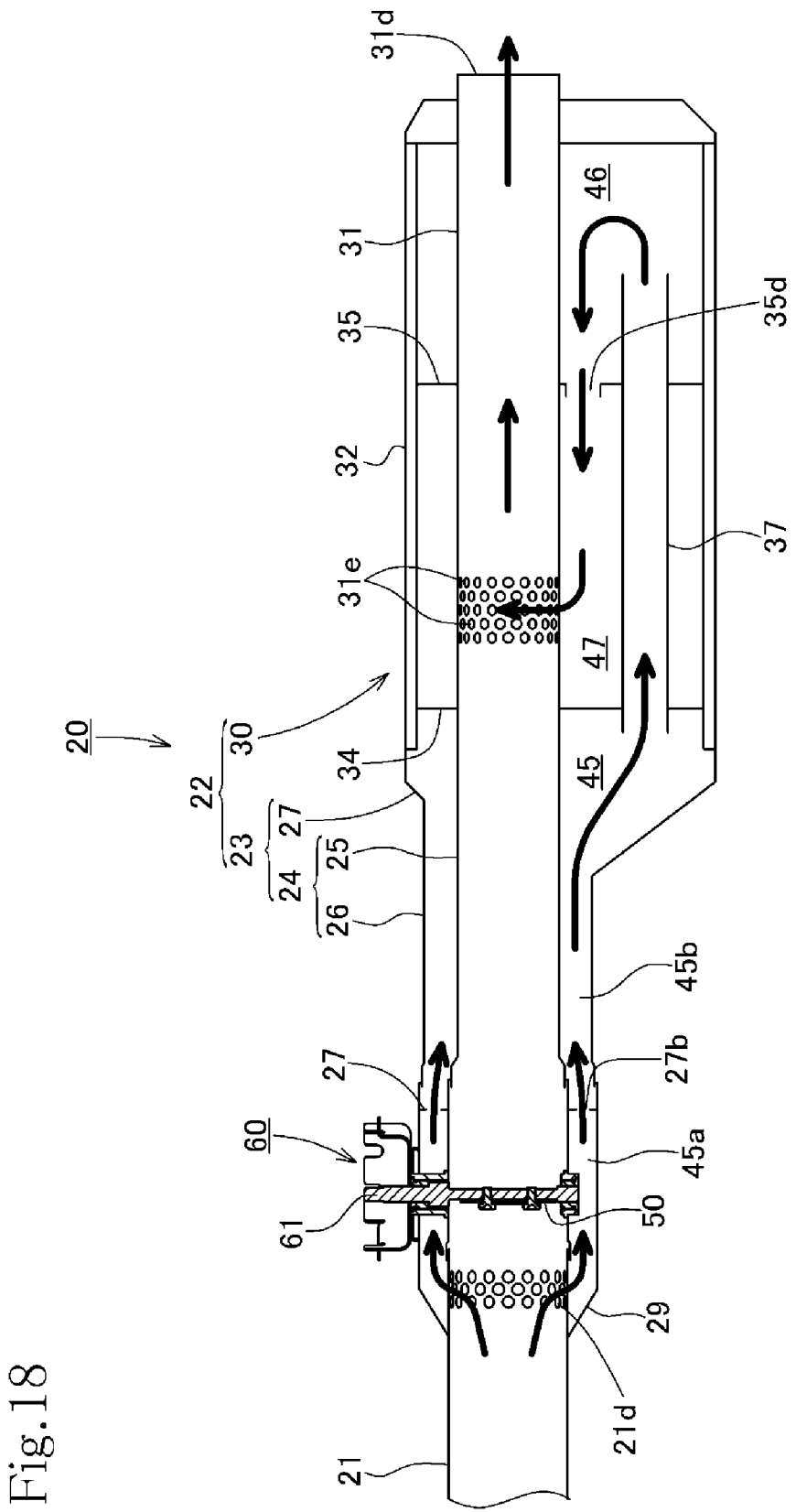
FIG. 18 is a schematic view of the exhaust muffler device, depicting a flow of exhaust gases while the exhaust valve is closed.

FIG. 18 schematically depicts a flow of exhaust gases while the exhaust valve 50 is closed. Providing the output power of the internal combustion engine E is very small, when the valve actuator 60 is operated to close the exhaust valve 50, the exhaust gases in the exhaust pipe 21 are blocked by the exhaust valve 50 in the first divided inner pipe 25a. Since the amount of exhaust gases emitted from the internal combustion engine E is small in this state, most of the exhaust gases pass through the gap between the outer circumferential edge of the exhaust valve 50 and the inner circumferential surface of the first divided inner pipe 25a. The pressure wave generated by the exhaust gases, which causes exhaust sounds, passes through the first through holes 21d in the exhaust pipe 21 upstream of the exhaust valve 50 and is transmitted into the first compartment 45a of the first expansion chamber 45.

Thereafter, the pressure wave passes from the first compartment 45a through the fluid communication holes 27b in the annular plate member 27 into the second compartment 45b, then from the second compartment 45b through the fluid communication pipe 37 that is open into the second compartment 46 into the second expansion chamber 46. Then, the pressure wave passes from the second expansion chamber 46 through the fluid communication holes 35d in the second partition wall 35 into the third expansion chamber 47. Thereafter, the pressure wave passes from the third expansion chamber 47 through the second through holes 31e in the exhaust passage pipe 31 into the exhaust passage pipe 31, and is discharged into the ambient air from the downstream end 31d of the exhaust passage pipe 31. While the exhaust valve 50 is closed, therefore, the exhaust gases emitted from the internal combustion engine E pass through the inner pipe 25 and the exhaust passage pipe 31, while the pressure wave of the exhaust gases passes through the expansion chambers 45, 46, and 47, so that the exhaust sounds are reduced.

The exhaust valve 50 is controlled so as to be opened in proportion to the output power of the internal combustion engine E. The opening of the exhaust valve 50 is adjusted to cause the exhaust gases to flow in a manner to match the characteristics of the internal combustion engine E, thereby adjusting the flow rate of the exhaust gases. As the pressure wave is caused to pass into the expansion chambers (first expansion chamber 45) upstream of the exhaust valve 50, the noise of the exhaust gases that increases in proportion to the output power is effectively silenced. The exhaust muffler structure described above is able to separate an exhaust output route and a sound route from each other, so that the output power can be adjusted by a simple structure while a satisfactory silencing capability is achieved. Since the exhaust valve 50 is of the butterfly type, the output power of the internal combustion engine E can be set to a desired level and the silencing capability for the exhaust sounds can be set to a desired level by changing the opening of the exhaust valve 50.

Inasmuch as the exhaust device 20 for the internal combustion engine according to the embodiment of the present invention is of the above structure, it offers the following advantages.

The exhaust device 20 according to the present embodiment includes a vertically curved portion 23a in the first muffler section 23 that includes the tubular member 24 which is of a multi-walled pipe configuration made up of the inner pipe 25 and the outer pipe 26, thereby allowing the first muffler section 23 to be inclined vertically, so that the length of the first muffler section 23 in the longitudinal directions is reduced while making it easy to increase the volume of the first muffler section 23. There is thus provided an exhaust device 20 including the muffler 22 that is compact in a longitudinal direction thereof. As the first muffler section 23 positioned forwardly is smaller in diameter and the second muffler section 30 in which the second expansion chamber 46 larger in cross-sectional area than the first expansion chamber 45 is disposed is disposed at a higher position on the vehicle, the motorcycle 1 that is a saddle-type vehicle can have a larger banking angle.

Furthermore, the first muffler section 23 that includes the tubular member 24 which is of a multi-walled pipe configuration made up of the inner pipe 25 and the outer pipe 26, extends from a position in front of the rear wheel to a position on a side thereof, as depicted in FIG. 1, and the first muffler section 23 includes the curved portion 23a that is curved in the transverse directions of the vehicle such that the second muffler section 30 lies along the longitudinal directions of the vehicle outwardly of the swing arm 6, as depicted in FIG. 2. Therefore, the exhaust muffler 22 is compact in a longitudinal direction thereof, and the second expansion chamber 46 and the third expansion chamber 47, which are large in size, in the rear second muffler section 30 of the exhaust muffler 22, are prevented from protruding in the widthwise directions of the vehicle, keeping a banking angle for the motorcycle 1. As the distance by which the first muffler section 23 extends in the widthwise directions of the vehicle is gained, the volume of the first expansion chamber 45 is increased.

Since the tubular member 24 of the first muffler section 23 is disposed on the line segment L interconnecting the pivot shaft 2d and the rear wheel drive axle 6a, at the point that is closer to the pivot shaft 2d than the point which is spaced from the pivot shaft 2d by the distance that is two thirds of the length of the line segment L, the tubular member 24 and the swing arm 6 can be placed in a vertical array at a position where the range of angular movement of the swing arm 6 is relatively small. Therefore, limitations on the height of the tubular member 24 are reduced, and the volume of the first expansion chamber 45 is increased.

Because the pivot shaft 2d is disposed at the higher position than the rear wheel drive axle 6a, a large space is available below the swing arm 6 near the pivot shaft 2d as a space where the tubular member 24 of a multi-walled pipe configuration that is larger in diameter than a single-walled pipe configuration is disposed.

Moreover, as depicted in FIG. 3, since the valve actuator 60 for actuating the exhaust valve 50 is disposed above the first muffler section 23 behind the vehicle body frame 2 and below the swing arm 6 in the widthwise directions of the vehicle, the valve actuator 60 is disposed in a space surrounded by the vehicle body frame 2, the swing arm 6, and the first muffler section 23, and it is protected without a dedicated cover provided therefor.

Inasmuch as the exhaust pipe 21 is arranged to be inclined from one side in the widthwise directions of the vehicle across the center of the vehicle toward the other side of the vehicle where the first muffler section 23 is disposed, below the internal combustion engine E, the exhaust pipe 21 and the first muffler section 23 can have increased lengths.

Furthermore, as depicted in FIG. 2, the catalytic device 21c is provided in the exhaust pipe 21 and offset to one side in a widthwise direction of the vehicle, and has its upper and right sides surrounded by the internal combustion engine E. The temperature of the catalyst is increased by the heat of the internal combustion engine E. The exhaust pipe 21, which includes a short pipe, provides a passage between the catalytic device 21c and the first muffler section 23, resulting in a reduction in the cost of the exhaust device 20. As the catalytic device 21c is not disposed in the first muffler section 23 which is of a multi-walled pipe configuration, the volume of the first expansion chamber 45 can be increased.

In addition, as depicted in FIG. 13, the second muffler section 30 houses therein the exhaust passage pipe 31 connected to the downstream end $25b_2$ of the inner pipe 25, and the exhaust passage pipe 31 has the first opening $31c_1$ that is open at the upstream end 31c connected to the inner pipe 25 and the second opening 31e into which exhaust gases that have passed through the second expansion chamber 46 flow. The upstream end 31c of the exhaust passage pipe 31 and the downstream end 31c1 of the inner pipe 25 are telescopically connected to each other. The inner pipe 25 and the exhaust passage pipe 31 are connected by being axially interfitted, so that the inner pipe 25 and the exhaust passage pipe 31 can easily be assembled together and the exhaust device can be reduced in weight and cost as the number of welded spots thereon is reduced. Since the inner pipe 25 and the exhaust passage pipe 31 are expandable and contractible by heat in their longitudinal directions, the telescopically interfitted structure is able to absorb their thermally induced expansions and contractions.

The inner pipe 25 is made up of the first divided inner pipe 25a and the second divided inner pipe 25b that are telescopically connected to each other by being axially interfitted. Since the first divided inner pipe 25a and the second divided inner pipe 25b are axially interfitted, the divided pipes themselves and the second expansion chamber can easily be assembled together and the exhaust device can be reduced in weight and cost as the number of welded spots thereon is reduced. Since the telescopically interfitted structure is able to absorb thermally induced expansions and contractions of the first divided inner pipe 25a and the second divided inner pipe 25b.

The curved portion 23a of the first muffler section 23 is provided between an area where the exhaust valve 50 is disposed and an area where the exhaust passage pipe 31 is connected. Therefore, the exhaust valve 50 is disposed in an area shaped as a straight pipe other than the curved portion 23a, and hence may have its valve configuration and valve actuating mechanism simplified. The exhaust passage pipe 31 is provided as a straight pipe, thereby simplifying the second expansion chamber 46 that houses the exhaust passage pipe 31 therein.

Figure 19:
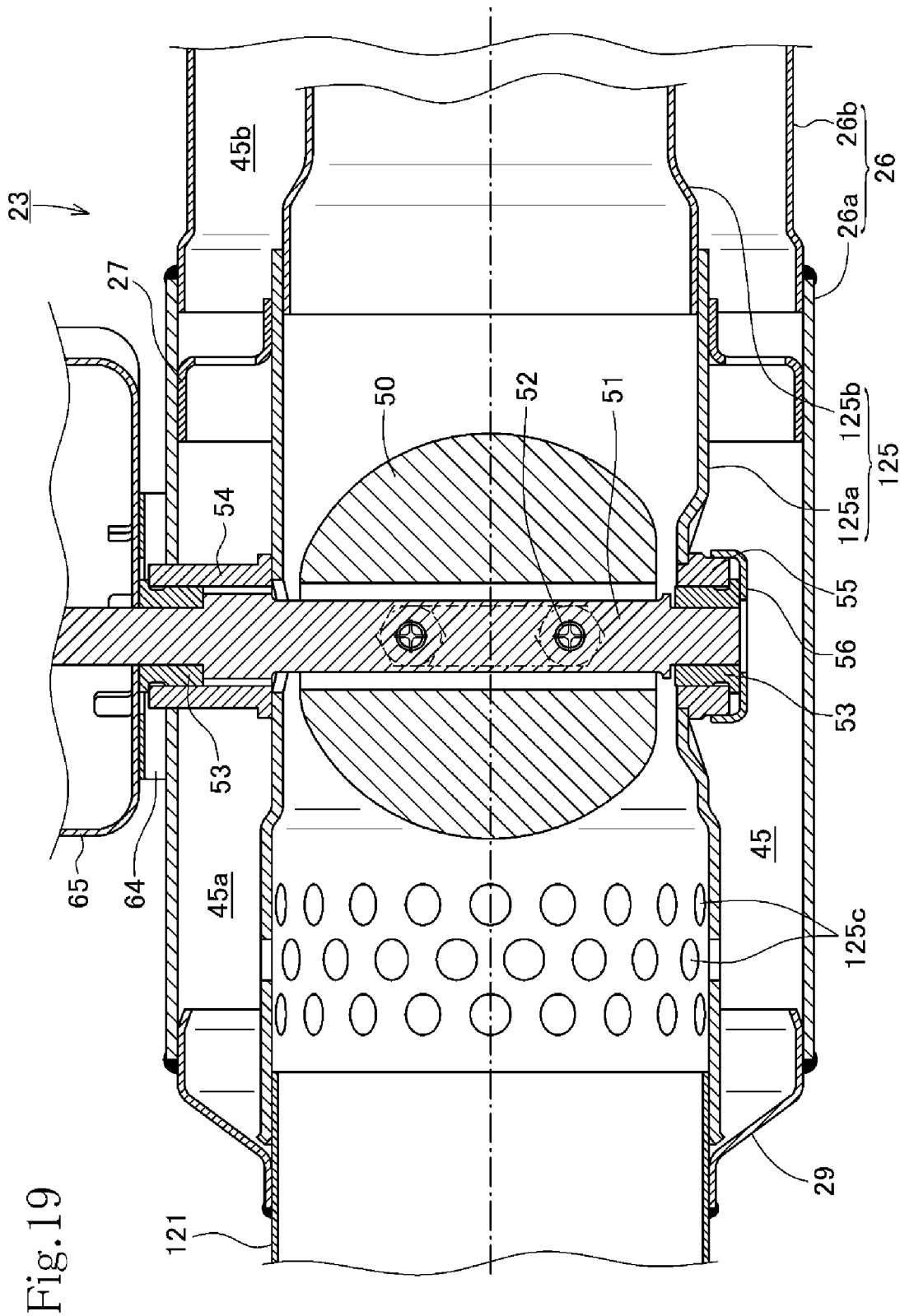
FIG. 19 is a fragmentary horizontal sectional view of a first muffler section of an exhaust device for an internal combustion engine according to a second embodiment of the present invention.

In the above embodiment, the exhaust pipe 21 has the first through holes 21d defined therein as holes through which exhaust gases in the exhaust pipe 21 and the first divided inner pipe 25a flow into the first expansion chamber 45 upstream of the exhaust valve 50. However, as depicted in FIG. 19, an exhaust device 20 may include an exhaust pipe 121 free of through holes. In this modification, an inner pipe 125 is made up of a first divided inner pipe 125a having first through holes 125c defined therein and a second divided inner pipe 125b. The first through holes 125c defined in the first divided inner pipe 125a are used as holes through which exhaust gases in the exhaust pipe 121 and the first divided inner pipe 125a flow into the first expansion chamber 45 upstream of the exhaust valve 50.

Although the embodiments of the present invention have been described in detail above, the present invention is not limited to the above embodiments, but various other changes and modifications may be made therein. The exhaust device 20 according to the present invention is not limited to use on the two-wheel motorcycle 1, but is also widely applicable to other types of saddle-type vehicles.

REFERENCE SIGNS LIST

E . . . Internal combustion engine,
1 . . . Two-wheel motorcycle, 2 . . . Vehicle body frame, 2d . . . Pivot shaft, 6 . . . Swing arm, 6a . . . Rear wheel drive axle,
20 . . . Exhaust device, 21 . . . Exhaust pipe, 21e . . . Downstream end, 22 . . . Exhaust muffler, 22a . . . Front end, 23 . . . First muffler section, 23a . . . Curved portion, 24 . . . Tubular member, 25 . . . Inner pipe, 25a . . . First divided inner pipe, 25b . . . Second divided inner pipe, 25b$_2$ . . . Downstream end, 26 . . . Outer pipe, 27 . . . Annular plate member, 27b . . . Fluid communication hole, 28 . . . Connector,

30 . . . Second muffler section, 32 . . . Second muffler body, 31c$_1$ . . . First opening, 31e . . . Second through hole, 34 . . . First partition wall, 35 . . . Second partition wall,

40 . . . Exhaust passage pipe, 40a . . . Upstream end, 41 . . . Front exhaust passage pipe, 41a . . . First exhaust passage pipe, 41b . . . Second exhaust passage pipe, 42 . . . Rear exhaust passage pipe, 42a . . . Third exhaust passage pipe, 42b . . . Fourth exhaust passage pipe, 45 . . . First expansion chamber, 46 . . . Second expansion chamber, 47 . . . Third expansion chamber,

50 . . . Exhaust valve,

60 . . . Valve actuator

The invention claimed is:

1. An exhaust device for an internal combustion engine, for discharging exhaust gases from an internal combustion engine supported on a vehicle body frame of a saddle-type vehicle, wherein said exhaust device comprises an exhaust pipe connected to said internal combustion engine, and an exhaust muffler connected to a downstream side of said exhaust pipe, wherein said exhaust muffler includes a first muffler section connected to a downstream end of said exhaust pipe and a second muffler section connected to a downstream side of said first muffler section, to cause exhaust gases delivered from said exhaust pipe to pass through said first muffler section to be discharged from said second muffler section out of said exhaust muffler, wherein said first muffler section includes a tubular member made up of an inner pipe to which said exhaust pipe is connected and an outer pipe covering said inner pipe, and a connector connecting said tubular member and said second muffler section to each other, wherein said first muffler section has a first expansion chamber defined therein between said inner pipe and said outer pipe, wherein said inner pipe houses therein a valve for changing an amount of exhaust gases passing through said inner pipe, wherein said first muffler section includes a curved portion curved vertically as viewed in side elevation of the vehicle, wherein said exhaust muffler has a second expansion chamber defined in said second muffler section rearward and upward of said first muffler section, said second expansion chamber having a cross-sectional area larger than a cross-sectional area of said first expansion chamber, wherein said inner pipe and said outer pipe in said curved portion are disposed concentrically to each other, wherein said second muffler section has a second muffler body serving as an outer shell forming said second expansion chamber and an exhaust passage pipe which is connected to a downstream end of said inner pipe of said first muffler section and is held in fluid communication with ambient air, wherein said valve is driven by a valve actuator provided outside said first muffler portion to change a flow rate to said first expansion chamber and said exhaust passage pipe, wherein an outside diameter of said first muffler portion is smaller than an outside diameter of said second muffler portion, wherein said outer pipe of said first muffler section is connected to said second muffler body of said second muffler section via said connector, and wherein said inner pipe and said exhaust passage pipe are sequentially connected to a downstream exhaust pipe of said exhaust pipe with a cylindrical shape of essentially a same diameter, said inner pipe and said exhaust passage pipe extending through said first muffler section and said second muffler section having a larger cross sectional area.

2. The exhaust device for an internal combustion engine according to claim 1, wherein: said exhaust pipe is inclined from one side in a widthwise direction of the vehicle across the center of the vehicle toward the other side of the vehicle where said first muffler section is disposed, below said internal combustion engine.

3. The exhaust device for an internal combustion engine according to claim 2, wherein: said exhaust pipe houses a catalytic device therein; and said catalytic device is offset to one side in a widthwise direction of the vehicle, and has its upper and other sides surrounded by said internal combustion engine.

4. The exhaust device for an internal combustion engine according to claim 1, wherein: said second muffler section houses therein an exhaust passage pipe connected to a downstream end of said inner pipe; said exhaust passage pipe has a first opening that is open at an upstream end thereof which is connected to said inner pipe and a second opening into which exhaust gases that have passed through said second expansion chamber flow; and said upstream end of said exhaust passage pipe and said downstream end of said inner pipe are telescopically connected to each other.

5. The exhaust device for an internal combustion engine according to claim 4, wherein said inner pipe is made up of a plurality of divided inner pipes that are telescopically connected to each other by being interfitted.

6. The exhaust device for an internal combustion engine according to claim 5, wherein said curved portion is disposed between an area where said valve is disposed and an area where said exhaust passage pipe is connected.

7. The exhaust device for an internal combustion engine according to claim 4, wherein said curved portion is disposed between an area where said valve is disposed and an area where said exhaust passage pipe is connected.

8. An exhaust device for an internal combustion engine, for discharging exhaust gases from an internal combustion engine supported on a vehicle body frame of a saddle-type vehicle, wherein said exhaust device comprises an exhaust pipe connected to said internal combustion engine, and an exhaust muffler connected to a downstream side of said exhaust pipe, wherein said exhaust muffler includes a first muffler section connected to a downstream end of said exhaust pipe and a second muffler section connected to a downstream side of said first muffler section, to cause exhaust gases delivered from said exhaust pipe to pass through said first muffler section and to be discharged from said second muffler section out of said exhaust muffler, wherein said first muffler section includes a tubular member made up of an inner pipe to which said exhaust pipe is connected and an outer pipe covering said inner pipe, and a connector connecting said tubular member and said second muffler section to each other, wherein said first muffler section has a first expansion chamber defined therein between said inner pipe and said outer pipe, wherein said inner pipe houses therein a valve for changing an amount of exhaust gases passing through said inner pipe, wherein said first muffler section includes a curved portion curved vertically as viewed in side elevation of the vehicle, wherein said exhaust muffler has a second expansion chamber defined in said second muffler section rearwardly and upward of said first muffler section, said second expansion chamber having a cross-sectional area larger than a cross-sectional area of said first expansion chamber, wherein said inner pipe and said outer pipe in said curved portion are disposed concentrically to each other, wherein said second muffler section has a second muffler body serving as an outer shell forming said second expansion chamber and an exhaust passage pipe which is connected to a downstream end of said inner pipe of said first muffler section and is held in fluid communication with ambient air, wherein said valve is driven by a valve actuator provided outside said first muffler portion to change a flow rate to said first expansion chamber and said exhaust passage pipe, wherein an outside diameter of said first muffler portion is smaller than an outside diameter of said second muffler portion, wherein said outer pipe of said first muffler section is connected to said second muffler body of said second muffler section via said connector, and wherein an exhaust valve shaft to which said valve is fastened is rotatably supported through a cylindrical support member which connects an inner side of said inner pipe and an outer side of said outer pipe, and is coupled to said valve driving unit.

9. The exhaust device for an internal combustion engine according to claim 8, further comprising a valve actuator for actuating said valve, wherein said valve actuator is disposed above said first muffler section.

10. The exhaust device for an internal combustion engine according to claim 9, wherein: said exhaust pipe is inclined from one side in a widthwise direction of the vehicle across the center of the vehicle toward the other side of the vehicle where said first muffler section is disposed, below said internal combustion engine.

11. The exhaust device for an internal combustion engine according to claim 9, wherein: said second muffler section houses therein an exhaust passage pipe connected to a downstream end of said inner pipe; said exhaust passage pipe has a first opening that is open at an upstream end thereof which is connected to said inner pipe and a second opening into which exhaust gases that have passed through said second expansion chamber flow; and said upstream end of said exhaust passage pipe and said downstream end of said inner pipe are telescopically connected to each other.

12. The exhaust device for an internal combustion engine according to claim 8, wherein: said exhaust pipe is inclined from one side in a widthwise direction of the vehicle across the center of the vehicle toward the other side of the vehicle where said first muffler section is disposed, below said internal combustion engine.

13. The exhaust device for an internal combustion engine according to claim 8, wherein: said second muffler section houses therein an exhaust passage pipe connected to a downstream end of said inner pipe; said exhaust passage pipe has a first opening that is open at an upstream end thereof which is connected to said inner pipe and a second opening into which exhaust gases that have passed through said second expansion chamber flow; and said upstream end of said exhaust passage pipe and said downstream end of said inner pipe are telescopically connected to each other.

\* \* \* \* \*